US012302176B2

(12) United States Patent
Uchiyama

(10) Patent No.: US 12,302,176 B2
(45) Date of Patent: May 13, 2025

(54) WIRELESS TERMINAL APPARATUS, COMMUNICATION CONTROL METHOD, COMMUNICATION CONTROL PROGRAM, AND BASE STATION

(71) Applicant: Sony Group Corporation, Tokyo (JP)

(72) Inventor: Hiromasa Uchiyama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 288 days.

(21) Appl. No.: 17/640,835

(22) PCT Filed: Aug. 12, 2020

(86) PCT No.: PCT/JP2020/030657
§ 371 (c)(1),
(2) Date: Mar. 7, 2022

(87) PCT Pub. No.: WO2021/054002
PCT Pub. Date: Mar. 25, 2021

(65) Prior Publication Data
US 2022/0345945 A1      Oct. 27, 2022

(30) Foreign Application Priority Data
Sep. 19, 2019   (JP) .................................. 2019-170010

(51) Int. Cl.
*H04L 67/12*    (2022.01)
*H04W 28/08*    (2023.01)
(Continued)

(52) U.S. Cl.
CPC ............. *H04W 28/24* (2013.01); *H04L 67/12* (2013.01); *H04W 28/0925* (2020.05); *H04W 4/38* (2018.02)

(58) Field of Classification Search
CPC ............. H04W 28/24; H04W 28/0925; H04W 4/38; H04W 72/541; H04W 76/14; H04W 4/33; H04L 67/12
See application file for complete search history.

(56) References Cited

U.S. PATENT DOCUMENTS

2008/0027501 A1    1/2008   Haubrich
2011/0110281 A1*   5/2011   Mehta ................. A61B 5/0002
                                                              370/310
(Continued)

FOREIGN PATENT DOCUMENTS

CN     101005440 A    7/2007
JP     2010524050 A   7/2010
(Continued)

OTHER PUBLICATIONS

International Search Report and Written Opinion mailed on Nov. 2, 2020, received for PCT Application PCT/JP2020/030657, Filed on Aug. 12, 2020, 9 pages including English Translation.

Primary Examiner — Edan Orgad
Assistant Examiner — Malick A Sohrab
(74) Attorney, Agent, or Firm — XSENSUS LLP

(57) ABSTRACT

A wireless terminal apparatus according to the present disclosure is a wireless terminal apparatus that performs wireless communication with a medical device arranged in a space of a medical institution, the wireless terminal apparatus including: an acquisition unit configured to acquire communication policy information decided by quality of service (QoS) information based on device information indicating a type of the medical device and transmission information indicating a type of a transmission content transmitted by the medical device; and a communication control unit configured to control the wireless communication on the basis of the communication policy information.

20 Claims, 16 Drawing Sheets

(51) Int. Cl.
*H04W 28/24* (2009.01)
*H04W 4/38* (2018.01)

(56) References Cited

U.S. PATENT DOCUMENTS

| | | |
|---|---|---|
| 2013/0337862 A1 | 12/2013 | Liu |
| 2014/0349660 A1* | 11/2014 | Abdalla ................ H04W 4/70 455/450 |
| 2017/0303322 A1 | 10/2017 | Watfa et al. |
| 2018/0070371 A1* | 3/2018 | Shin ..................... H04W 72/23 |
| 2018/0176293 A1 | 6/2018 | Ding |
| 2018/0183684 A1 | 6/2018 | Jacobson |
| 2018/0316748 A9* | 11/2018 | Ding ..................... H04W 8/005 |
| 2019/0037448 A1 | 1/2019 | Shan |
| 2019/0045028 A1* | 2/2019 | Wysocki ................ H04L 67/61 |
| 2019/0082356 A1* | 3/2019 | Ode .................... H04L 12/1407 |
| 2019/0206004 A1* | 7/2019 | Shelton, IV ............. H04L 9/14 |
| 2019/0223054 A1 | 7/2019 | Nunna et al. |
| 2020/0005666 A1* | 1/2020 | Shen .................... H04L 67/125 |
| 2020/0145884 A1* | 5/2020 | Guo ..................... H04M 15/64 |
| 2020/0177266 A1* | 6/2020 | Kang ................ H04W 74/0833 |
| 2022/0095177 A1* | 3/2022 | Han .................. H04W 36/0079 |
| 2022/0110174 A1* | 4/2022 | Kang ..................... H04W 24/10 |
| 2022/0191711 A1* | 6/2022 | Parihar ................ H04B 7/0689 |
| 2023/0035965 A1* | 2/2023 | Ahmad ................... H04W 4/06 |

FOREIGN PATENT DOCUMENTS

| | | |
|---|---|---|
| JP | 2011504114 A | 2/2011 |
| JP | 2015527757 A | 9/2015 |
| JP | 2016-87248 A | 5/2016 |
| JP | 2017-513291 A | 5/2017 |
| WO | 2017/199379 A1 | 11/2017 |
| WO | WO-2019161269 A1 | 8/2019 |

* cited by examiner

| INTEGRATED QoS LEVEL | ALLOCATION SOURCE QoS LEVEL |
|---|---|
| 1 | 1 (TERMINAL A) |
| 2 | 1 (TERMINAL B) |
| 3 | 2 (TERMINAL A) |
| 4 | 2 (TERMINAL B) |
| 5 | 3 (TERMINAL A) |
| 6 | 3 (TERMINAL B) |

| INTEGRATED QoS LEVEL | WIRELESS COMMUNICATION PARAMETER | | | |
|---|---|---|---|---|
| | TRANSMISSION POWER | ALLOCATED FREQUENCY RESOURCE (NUMBER OF Resource blocks) | CODING RATE | ... |
| 1 | 30 | 100 | 0.9 | ... |
| 2 | 32 | 200 | 0.7 | ... |
| 3 | 34 | 400 | 0.4 | ... |
| 4 | 40 | 800 | 0.2 | ... |
| 5 | 50 | 1600 | 0.1 | ... |
| 6 | ... | ... | ... | ... |

| QoS LEVEL | TRANSMISSION CONTENT | ... |
|---|---|---|
| 1 | INF1 | ... |
| 2 | INF2 | ... |
| 3 | ... | ... |

WIRELESS TERMINAL APPARATUS, COMMUNICATION CONTROL METHOD, COMMUNICATION CONTROL PROGRAM, AND BASE STATION

CROSS-REFERENCE TO RELATED APPLICATIONS

The present application is based on PCT filing PCT/JP2020/030657, filed Aug. 12, 2020, which claims priority to Japanese Application No. 2019-170010, filed Sep. 19, 2019, the entire contents of each are incorporated herein by reference.

FIELD

The present disclosure relates to a wireless terminal apparatus, a communication control method, a communication control program, and a base station.

BACKGROUND

In recent years, various medical devices have been used for surgery, and a plurality of medical devices is provided in an operating room. When all these medical devices are connected by wire, wiring becomes complicated, and the wiring hinders movement when an operating room member moves. Therefore, there is a demand for wireless medical devices. However, when a plurality of medical devices is wireless, various traffic occurs, and there is a concern that connection stability of wireless connection is lowered.

Therefore, a method of stably performing communication by providing a plurality of transmission/reception units (antennas) that perform wireless communication has been proposed (For example, Patent Literature 1). The technique described in Patent Literature 1 proposes a configuration in which a plurality of transmission/reception units (antennas) is provided at four corners of an operating table.

CITATION LIST

Patent Literature

Patent Literature 1: Japanese Patent Application Laid-open No. 2016-87248

SUMMARY

Technical Problem

However, in the conventional art, the number of components (apparatuses) used for communication such as antennas is increased to improve communication quality such as connection stability, and there is a problem that it is necessary to add a new apparatus and the configuration becomes complicated. In addition, in a case where an antenna is installed on a tool used in an operating room such as an operating table, installation work or the like is required, and there is also a problem that the cost increases. Therefore, it is desired to improve connection quality of communication of a plurality of medical devices without providing a new apparatus.

Therefore, the present disclosure proposes a wireless terminal apparatus, a communication control method, a communication control program, and a base station capable of improving communication quality of wireless connection of a medical device arranged in a space of a medical institution.

Solution to Problem

According to the present disclosure, a wireless terminal apparatus that performs wireless communication with a medical device arranged in a space of a medical institution, the wireless terminal apparatus includes an acquisition unit configured to acquire communication policy information decided by quality of service (QoS) information based on device information indicating a type of the medical device and transmission information indicating a type of a transmission content transmitted by the medical device; and a communication control unit configured to control the wireless communication on a basis of the communication policy information.

BRIEF DESCRIPTION OF DRAWINGS

FIG. 4 is a diagram illustrating an example of an integrated QoS information storage unit according to the first embodiment.

FIG. 5 is a diagram illustrating an example of a communication parameter information storage unit according to the first embodiment.

DESCRIPTION OF EMBODIMENTS

Figure 1:
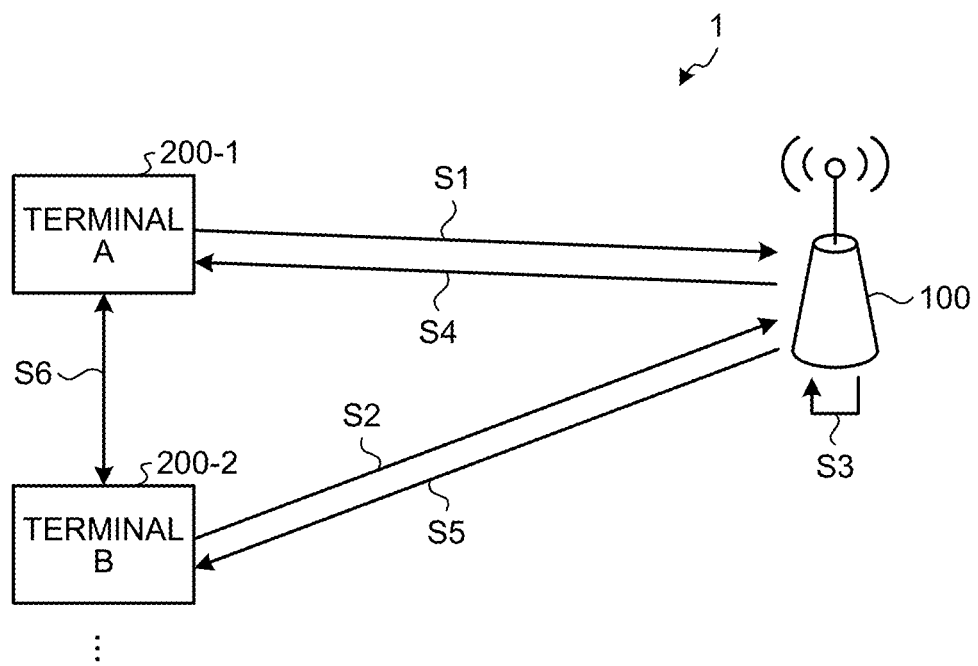
FIG. 1 is a diagram illustrating an example of communication control processing according to a first embodiment of the present disclosure.

The embodiments of the present disclosure will be described below in detail on the basis of the drawings. Note that the wireless terminal apparatus, the communication control method, the communication control program, and the base station according to the present application are not limited by the embodiments. In addition, in each embodiment described below, the same parts are designated by the same reference numerals, and duplicate description will be omitted.

The present disclosure will be described in the order of items described below.
1. First Embodiment
   1-1. Overview of the communication control processing according to the first embodiment of the present disclosure
   1-2. Application example of the communication control system to operating room
   1-3. Configuration of the base station according to the first embodiment
   1-4. Configuration of the terminal according to the first embodiment
   1-5. Procedure of the communication control processing according to the first embodiment
   1-6. Overview of the communication control system
      1-6-1. Integrated QoS level
      1-6-2. Wireless communication parameter
      1-6-3. QoS-related information
   1-7. Conceptual diagram of the communication control system
2. Second Embodiment
   2-1. Overview of the communication control processing according to the second embodiment of the present disclosure
   2-2. Configuration of the base station and the server according to the second embodiment
3. Third Embodiment
   3-1. Overview of the communication control processing according to the third embodiment of the present disclosure
   3-2. Configuration of the terminal according to the third embodiment
   3-3. Conceptual diagram of the communication control system
4. Fourth Embodiment
   4-1. Configuration of the communication control system according to the fourth embodiment of the present disclosure
5. Fifth Embodiment
   5-1. Configuration of the communication control system according to the fifth embodiment of the present disclosure
6. Other Embodiments
   6-1. Other configuration examples
   6-2. Others
7. Effects According to the Present Disclosure
8. Hardware Configuration

1. First Embodiment

[1-1. Overview of the Communication Control Processing According to the First Embodiment of the Present Disclosure]

FIG. 1 is a diagram illustrating an example of communication control processing according to the first embodiment of the present disclosure. In addition, FIG. 1 is a diagram illustrating a configuration example of a communication control system 1 according to the first embodiment of the present disclosure. The communication control processing according to the first embodiment of the present disclosure is realized by the communication control system 1 illustrated in FIG. 1. The communication control system 1 is a system that executes communication control according to quality of service (QoS).

First, a configuration of the communication control system 1 illustrated in FIG. 1 will be described. As illustrated in FIG. 1, the communication control system 1 includes a base station 100 and a plurality of terminals 200. In the example of FIG. 1, only two terminals 200: a terminal 200-1, which is a terminal A, and a terminal 200-2, which is a terminal B, are illustrated, but the communication control system 1 includes three or more terminals 200 such as a terminal 200-3, which is a terminal C (see FIG. 2), and a terminal 200-4, which is a terminal D (see FIG. 2). In addition, in a case where the terminals 200-1 to 200-4 and the like are described without being particularly distinguished, they are referred to as the terminal 200.

The terminal 200 is a wireless terminal apparatus that performs wireless communication with a medical device arranged in a space of a medical institution. The terminal 200 may be any device as long as the device performs wireless communication, for example, at the time of surgery or at a medical site. For example, the terminal 200 may be a pacemaker, a particle therapy apparatus, an artificial dialyzer, an infusion pump, an automatic peritoneal perfusion apparatus, an artificial heart-lung apparatus, a multi-person dialysate supply apparatus, or the like. In addition, the terminal 200 may be a component blood sampling apparatus, a ventilator, an X-ray imaging apparatus, an electrocardiograph, an ultrasonic diagnostic apparatus, an infusion set for an infusion pump, a catheter-related device, a hearing aid, a home massager, a blood gas analysis apparatus, or the like. In addition, the terminal 200 may be a monitor, a display, a medical robot, an endoscope, a surgical light, a medical bed, a nurse call device, a drip-related device, or the like. That is, the medical device here is a concept including various devices used at the time of surgery or at a medical field.

Figure 2:
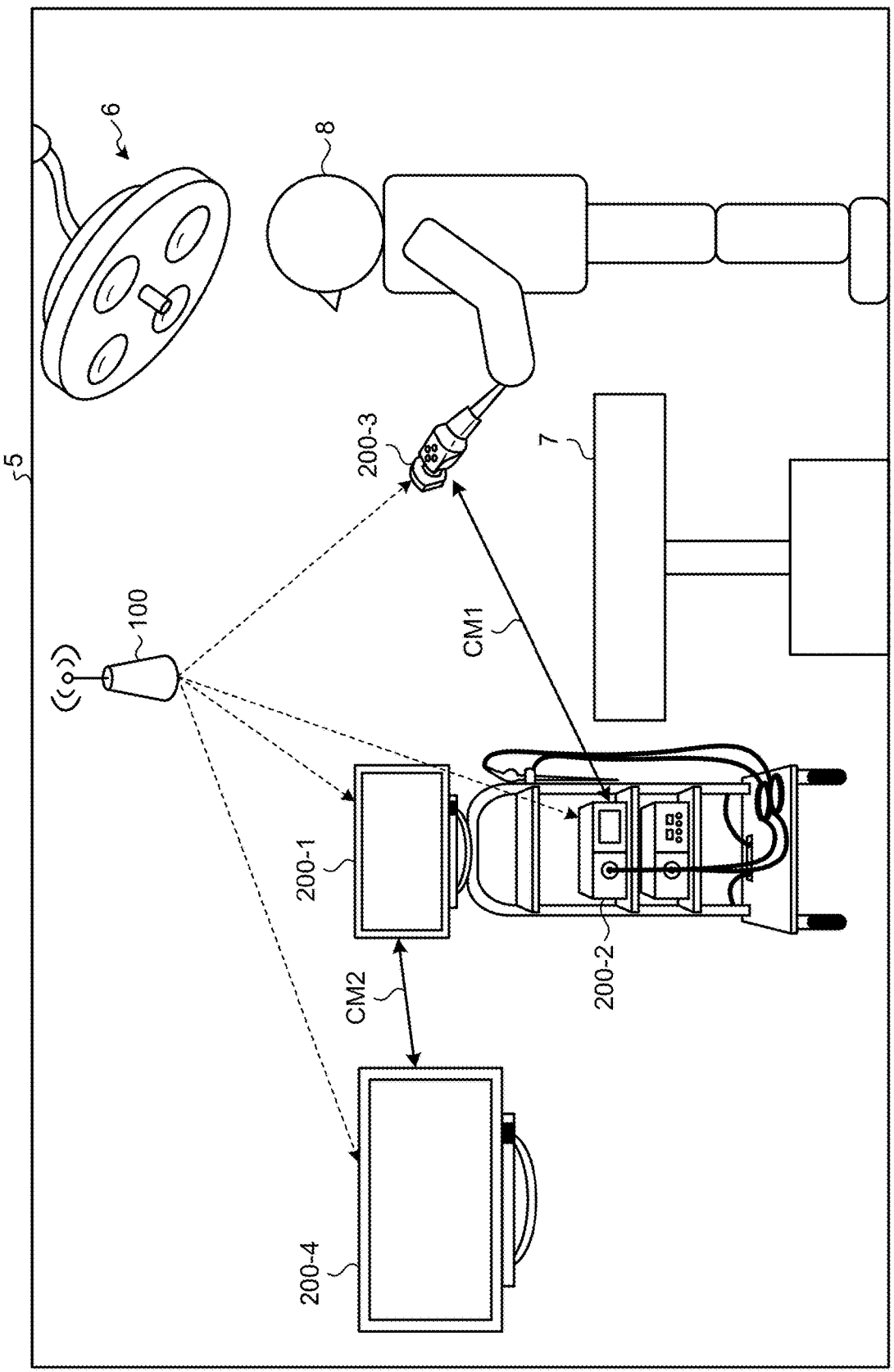
FIG. 2 is a diagram illustrating an example of application of a communication control system according to the first embodiment to an operating room.

The example of FIG. 1 illustrates a case where the terminal 200 is a medical device arranged in an operating room (such as an operating room 5 in FIG. 2). The terminal 200 performs wireless communication with another terminal 200 or the base station 100. Note that the terminal 200-1 is a monitor, and the terminal 200-2 is a sphygmomanometer, which will be described in detail with reference to FIG. 2. In addition, the terminal 200 may be various apparatuses such as an IP converter as long as it is an apparatus that performs wireless communication with a medical device arranged in a space of a medical institution, and details of this point will be described below.

The base station 100 is an apparatus that provides a wireless communication service to the terminal 200. The base station 100 is an apparatus used for communication between the terminals 200. For example, the base station 100 is a base station that provides a wireless communication service by a predetermined wireless communication system. For example, the wireless communication system is a fifth generation mobile communication system (5G). Hereinafter, the wireless communication system will be described as a fifth generation mobile communication system (5G). Note that the wireless communication system is various cellular wireless communication systems such as a fourth generation mobile communication system (4G) as long as the communication control processing is applicable, and a local wireless communication system technology such as Wi-Fi (registered trademark) may be used as physical layer wireless communication. The base station 100 performs wireless communication with a terminal 200 located in a space of a medical institution (such as the operating room 5 in FIG. 2). For example, the base station 100 transmits a downlink signal to the terminal 200 and receives an uplink signal from the terminal 200. For example, the communication control system 1 may be a system in which the cellular system (cellular wireless communication system) and the Wi-Fi system as described above are combined. For example, the communication control system 1 may be a system in which 5G (fifth generation mobile communication system) is integral with Wi-Fi communication. In this case, in the communication control system 1, Wi-Fi communication is performed, and Wi-Fi resource control or the like may be performed by the base station 100.

Communication is performed between the base station 100, the terminal 200-1, and the terminal 200-2 by wireless communication corresponding to a predetermined wireless communication system. Information is transmitted and received between the base station 100 and the terminal 200 by wireless communication corresponding to 5G. In addition, each terminal 200 transmits and receives information to and from another terminal 200 by wireless communication corresponding to 5G. In addition, the terminal 200 may have a function of direct terminal-to-terminal communication. In this case, the terminal 200 enables direct communication between the terminals while obtaining support of control from the base station. The control from the base station includes, for example, allocation of wireless resources in a direct terminal-to-terminal communication link, transmission power control, provision of a QoS control policy, interference control to another terminal, and the like. In addition, when the base station is absent, the terminal 200 can autonomously perform direct terminal-to-terminal communication. In this case, control from the base station as described above cannot be obtained, but wireless sensing or the like can be autonomously performed to establish a wireless communication link like Wi-Fi communication. Note that the communication control system 1 illustrated in FIG. 1 may include a plurality of base stations 100. In addition, the communication control system 1 is not limited to the base station 100 or the terminal 200, but may include various components. For example, the communication control system 1 may include components such as a server such as a server 300 illustrated in FIG. 11. For example, the server includes a core network such as an evolved packet core (EPC) or a 5G core. Note that a case where the integrated QoS level, the communication parameter, and the like are decided on the server side will be described below. A base station 100A enables connection to an external network via a core network.

First, the base station 100 acquires information related to QoS control (QoS control-related information) from the terminal 200-1, which is the terminal A (Step S1). For example, the base station 100 transmits a notification of request for QoS control-related information to the terminal 200-1, and receives the QoS control-related information from the terminal 200-1. For example, when a message type (type) to be transmitted is decided, the terminal 200 transmits the message and the priority information (QoS information) corresponding to each message to the base station 100 as the QoS control-related information. The terminal 200-1, which is a monitor, transmits packet message types related to monitor data and respective pieces of priority information to the base station 100. For example, the terminal 200-1 transmits three types of packet message types and respective pieces of priority information (see FIG. 7) to the base station. The terminal 200-1 transmits, to the base station, priority information indicating that the priority (QoS level) of monitor message type #1 is "1", the QoS level of monitor message type #2 is "2", and the QoS level of monitor message type #3 is "3". Note that the higher the level of the message type, the higher the importance (priority) of the message type. Note that a parameter such as a QoS identifier (5GQI) standardized by 5G new radio (NR) may be used as the QoS information here.

In addition, the base station 100 acquires QoS control-related information from the terminal 200-2, which is the terminal B (Step S2). For example, the base station 100 transmits a notification of request for QoS control-related information to the terminal 200-2, and receives the QoS control-related information from the terminal 200-2. The terminal 200-2, which is a sphygmomanometer, transmits real-time data of the sphygmomanometer, and transmits packet message types related to the sphygmomanometer and respective pieces of priority information to the base station 100. For example, the terminal 200-2 transmits three types of packet message types and respective pieces of priority information to the base station. The terminal 200-2 transmits, to the base station, priority information indicating that the priority (QoS level) of sphygmomanometer message type #1 is "1", the QoS level of sphygmomanometer message type #2 is "2", and the QoS level of sphygmomanometer message type #3 is "3".

The base station 100 that has obtained the QoS control-related information creates an integrated QoS control table (Step S3). For example, the base station 100 decides an integrated QoS level (importance level) on the basis of the QoS control-related information acquired from the terminal 200-1 and the terminal 200-2. In the example of FIG. 1, the base station 100 decides the integrated QoS levels (see FIG. 4) regarding three types of monitor message types #1 to #3 of the terminal 200-1, which is a monitor, and three types of sphygmomanometer message types #1 to #3 of the terminal 200-2, which is a sphygmomanometer. The base station 100 decides the integrated QoS levels in which the monitor message type #1 is "1", the sphygmomanometer message type #1 is "2", the monitor message type #2 is "3", the sphygmomanometer message type #2 is "4", the monitor message type #3 is "5", and the sphygmomanometer message type #3 is "6".

In addition, the base station 100 creates a table for deciding a method of controlling the wireless communication parameter according to the QoS level after integration (integrated QoS level). The base station 100 decides the wireless communication parameter for each of the integrated QoS levels "1" to "6". The base station 100 decides wireless communication parameters such as transmission power, allocated frequency resources, and a coding rate. The base station 100 decides the wireless communication parameters (see FIG. 5) such that the higher the integrated QoS level, the larger the transmission power, the larger the number of allocated frequency resources, and the better the coding rate.

Then, the base station 100 transmits information indicating the decided wireless communication parameters to the terminal 200-1 (Step S4). The base station 100 transmits information indicating wireless communication parameters such as transmission power, allocated frequency resources, and a coding rate to the terminal 200-1. For example, the base station 100 transmits information indicating the wireless communication parameters to the terminal 200-1 as communication policy information. For example, the base station 100 transmits information indicating a message type corresponding to each integrated QoS level and information indicating the wireless communication parameters of each message type to the terminal 200-1. The terminal 200-1 acquires information indicating the wireless communication parameters as the communication policy information. For example, the terminal 200-1 acquires the information indicating a message type corresponding to each integrated QoS level and the information indicating the wireless communication parameters of each message type.

In addition, the base station 100 transmits information indicating the decided wireless communication parameters to the terminal 200-2 (Step S5). The base station 100 transmits information indicating the wireless communication parameters such as transmission power, allocated frequency resources, and a coding rate to the terminal 200-2. For example, the base station 100 transmits information indicating the wireless communication parameters to the terminal 200-2 as communication policy information. For example, the base station 100 transmits information indicating a message type corresponding to each integrated QoS level and information indicating the wireless communication parameters of each message type to the terminal 200-2. The terminal 200-2 acquires information indicating the wireless communication parameters as the communication policy information. For example, the terminal 200-2 acquires the information indicating a message type corresponding to each integrated QoS level and the information indicating the wireless communication parameters of each message type.

Then, the terminal 200 controls the wireless communication on the basis of the communication policy information (Step S6). Each terminal 200 controls wireless communication on the basis of the acquired communication policy information. Each terminal 200 controls wireless communication on the basis of the acquired transmission power, allocated frequency resources, coding rate, and the like. Each terminal 200 transmits a message to another terminal 200 using the acquired communication policy information. The terminal 200 transmits a message of a message type with the transmission power, the allocated frequency resources, the coding rate, or the like corresponding to the message type. Note that each terminal 200 may directly communicate with another terminal 200 or may communicate via the base station 100. For example, the base station 100 controls wireless communication between the terminals 200 on the basis of the communication policy information. The base station 100 controls wireless communication between the terminals 200 by transmitting the communication policy information to the terminals 200 and causing the terminals 200 to communicate with each other on the basis of the communication policy information. In addition, in the case of base station communication, for example, the base station 100 transmits data (message) received from one terminal 200 to a terminal 200, which is the transmission destination, using the wireless communication parameters corresponding to the message type of the message.

For example, in communication using a conventional unlicensed band such as a wireless LAN, when device-to-device communication is performed, each communication is performed equally. On the other hand, in communication involving the life of a person, such as communication for medical use, communication in consideration of the priority of transmission packets is required. In particular, in a case where traffic with high priority that involves lives and traffic that is not very important are mixed, it is essential to perform control such that the traffic with high priority is prioritized.

In order to realize the above control, it is necessary to perform wireless communication link control according to the traffic to be transmitted. However, in the medical device communication, since there is no rule of priority decision for each common traffic, it is very difficult to control priority. Therefore, there is a demand for a system that sets common priority control according to the type of traffic between devices and controls wireless communication.

Therefore, the communication control system 1 can provide a wireless communication service capable of appropriate communication for each traffic priority by creating the integrated QoS table and collectively controlling the wireless communication link even between the terminals 200 having different QoS tables. The communication control system 1 can improve the connection stability of the device on the basis of the QoS control instead of increasing the connection stability by increasing the number of reception apparatuses or the like using a short-range wireless terminal.

[1-2. Application Example of the Communication Control System to Operating Room]

The communication control system 1 performs control related to wireless communication of a medical device arranged in a space of a medical institution such as an operating room. A case where the communication control system 1 performs control related to wireless communication of the terminal 200 in the operating room 5 will be described with reference to FIG. 2. FIG. 2 is a diagram illustrating an example of application of the communication control system according to the first embodiment to an operating room.

As illustrated in FIG. 2, the communication control system 1 controls wireless communication in a private space such as an operating room such as the operating room 5. For example, the communication control system 1 in which a private base station 100 such as 5G or 4G is provided in the operating room 5 performs control of the wireless communication link. For example, the base station 100 may be provided near the ceiling of the operating room 5 as illustrated in FIG. 2. For example, in a case where communication is performed using radio waves in a frequency band having high straightness, the base station 100 may be provided near the ceiling. For example, in the case of wireless communication corresponding to 5G, the base station 100 may be provided near the ceiling. Note that the base station 100 may be provided at any position as long as it can control wireless communication of the terminal 200 in the operating room 5.

In the example illustrated in FIG. 2, the base station 100 and a lighting device 6 such as a surgical light are arranged near the ceiling of the operating room 5. In addition, in the operating room 5, the terminal 200-1, which is a monitor, the terminal 200-2, which is a sphygmomanometer, the terminal 200-3, which is an endoscope, the terminal 200-4, which is another monitor, and the like are arranged. In addition, in the example of FIG. 2, an operator 8 such as a doctor performs treatment on a patient (not illustrated) on an operating table 7.

For example, the base station 100 performs communication control between the terminals 200. Wireless communication CM1 between the terminal 200-2 having a high integrated QoS level and the terminal 200-3 and wireless communication CM2 between the terminal 200-1 having a low integrated QoS level and the terminal 200-4 are controlled. For example, the base station 100 decides wireless communication parameters according to the integrated QoS level, and transmits information indicating the decided wireless communication parameters to each terminal 200, thereby performing communication control between the terminals 200. For example, the terminals 200-1 to 200-4 control wireless communication on the basis of communication policy information such as information indicating wireless communication parameters.

For example, a logical entity (management entity) that performs wireless communication link control is not limited to the base station 100, and may be physically arranged on a server side such as a core network. In addition, as described above, the wireless communication link may be direct communication (device-to-device communication) between devices (terminals 200), or may be downlink or uplink communication via the base station 100. Depending on the QoS level of traffic at each device (terminal 200), the logical entity (management entity) performs wireless communication control for each link.

Thus, the base station 100 and the terminal 200 can improve the communication quality of the wireless connection of the medical device arranged in the space of the medical institution such as the operating room. In addition, the communication control system 1 can improve the communication quality of the wireless connection such as the connection stability of the wireless connection of a plurality of medical devices in the operating room.

For example, when a plurality of medical devices in an operating room is wireless, it is assumed that all communication cannot be performed simultaneously when communicating with a local communication base (integrated communication control terminal) in the operating room since a communication band is a finite resource. In such a case, a packet loss or a delay occurs in communication, connection stability (communication quality) is lowered, information that the operator needs to view in real time becomes invisible, and the like, and there is a possibility that the progress of surgery is hindered. In addition, since each of the plurality of medical devices is a medical device sold by a different company, there is also a problem that it is difficult to adjust communication between the medical devices.

Therefore, the communication control system 1 performs QoS control by the local communication base (base station 100). For example, the communication control system 1 realizes communication quality that does not hinder the progress of surgery by interposing an adapter (wireless terminal) to decide the priority of communication. In addition, for a local communication terminal, priority can be decided for communication by forming an entity table (a table in which the QoS level, the type of medical devices, and the type of communication content are associated).

The communication control system 1 can unfailingly transmit a packet with high priority to a transmission destination by deciding QoS (integrated QoS). In addition, since a finite resource (orthogonal in time, space, frequency, and needed to be scheduled) is used, it is important to increase the quality of the packet. Therefore, the communication control system 1 can increase the communication quality (quality) by deciding the priority (importance) of the packet for each traffic. The communication control system 1 can increase communication quality by lowering a packet loss (lowering a packet error rate), reducing a delay, increasing the amount of frequency allocation (increasing a band), or the like. In addition, the communication control system 1 can increase the communication quality by performing a lot of encoding on a small amount of data or increasing transmission power (increasing reception strength and transmission strength). In addition, by deciding the priority as described above, the communication control system 1 can send some communication with higher communication quality than the other communication. For example, the communication control system 1 uses a QoS level (integrated QoS level) to share frequencies, perform scheduling, and decide time occupancy of time. The communication control system 1 may perform communication control such as switching the communication in an unlicensed band to a licensed band. In addition, the communication control system 1 may perform switching control of a link via a base station and a direct terminal-to-terminal communication link.

With the control described above, the communication control system 1 can improve the communication quality. The communication control system 1 performs communication in accordance with communication policy information determined on the basis of the QoS level. For example, in a case where the integrated QoS level is "1" to "5", the communication control system 1 decides the integrated QoS level to be "5" (maximum value) because it is required to display the video of the endoscope on a display apparatus without delay as much as possible. The communication control system 1 also decides the integrated QoS level of monitoring information such as heartbeat to be "5" (maximum value). In addition, the communication control system 1 decides the integrated QoS level to be "1" (minimum value) because real-time performance is not required for communication such as transmission of a video of an operating room camera for capturing an operation state or transmission of a recorded video of an endoscope (recording and storing in a server). By performing such processing, the communication control system 1 can unfailingly deliver information requiring real-time performance with little delay, and realizes communication quality that does not hinder the progress of surgery.

[1-3. Configuration of the Base Station According to the First Embodiment]

Figure 3:
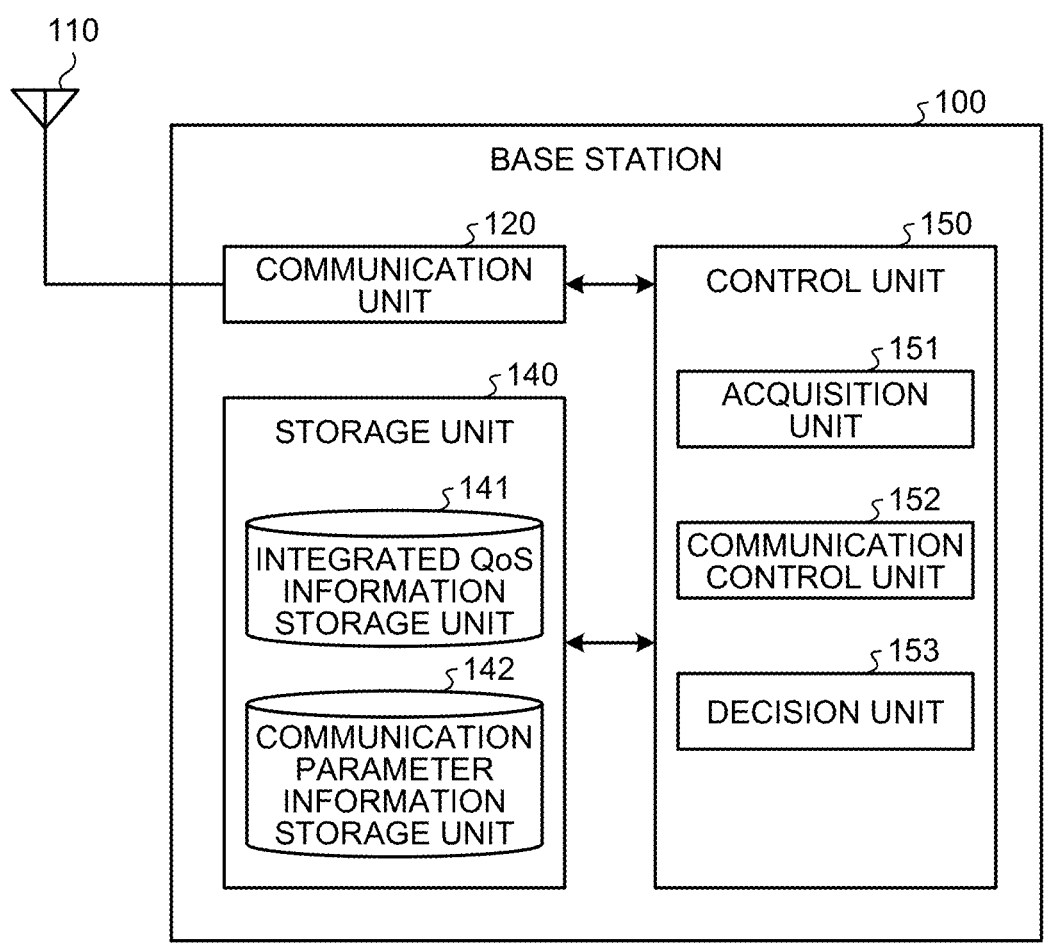
FIG. 3 is a diagram illustrating a configuration example of a base station according to the first embodiment.

Next, a configuration of the base station 100 according to the first embodiment will be described. FIG. 3 is a diagram illustrating a configuration example of a base station according to the first embodiment.

As illustrated in FIG. 3, the base station 100 includes an antenna unit 110, a communication unit 120, a storage unit 140, and a control unit 150.

The antenna unit 110 radiates a signal output from the communication unit 120 into a space as a radio wave. In addition, an antenna unit 210 converts a radio wave in a space into a signal and outputs the signal to the communication unit 120. For example, the antenna unit 110 includes an antenna used for wireless communication.

The communication unit 120 transmits and receives signals. For example, the communication unit 120 transmits a downlink signal to the terminal 200 and receives an uplink signal from the terminal 200. The communication unit 120 performs wireless communication with a medical device arranged in a space of a medical institution. The communication unit 120 performs wireless communication with a medical device arranged in an operating room.

The communication unit 120 is realized by, for example, a network interface card (NIC), a communication circuit, or the like. The communication unit 120 transmits and receives information to and from the terminal 200 by wireless communication. In addition, the communication unit 120 may be connected to a predetermined network (network N or the like in FIG. 12) by wire or wirelessly, and transmit and receive information to and from another apparatus or the like via the predetermined network.

The storage unit 140 is realized by, for example, a semiconductor memory element such as a random access memory (RAM) or a flash memory, or a storage apparatus such as a hard disk or an optical disk. The storage unit 140 includes an integrated QoS information storage unit 141 and a communication parameter information storage unit 142. Note that the storage unit 140 stores not only the information indicated in the integrated QoS information storage unit 141 or the communication parameter information storage unit 142, but also various types of information. The storage unit 140 may store information collected from each terminal 200. For example, the storage unit 140 may store QoS-related information collected from each terminal 200.

The integrated QoS information storage unit 141 according to the first embodiment stores integrated QoS information. The integrated QoS information storage unit 141 stores various types of information regarding QoS obtained by integrating QoS information collected from each terminal 200. FIG. 4 is a diagram illustrating an example of an integrated QoS information storage unit according to the first embodiment. The integrated QoS information storage unit 141 illustrated in FIG. 4 includes items such as "post-integration QoS level" and "allocation source QoS level".

The "post-integration QoS level" indicates a QoS level after integration. The "allocation source QoS level" indicates a QoS level of the allocation source, that is, the terminal 200 that is a provider of QoS information. Note that, in the example of FIG. 4, it is assumed that the larger the numerical value, the higher the importance (priority) of the post-integration QoS level and the allocation source QoS level.

In the example of FIG. 4, the post-integration QoS level "1" is indicated to correspond to the QoS level "1" in the terminal A (terminal 200-1). That is, it indicates that the post-integration QoS level of the message of the QoS level "1" transmitted by the terminal A is "1". As described above, in the case of FIG. 4, the message of the QoS level "1" transmitted by the terminal A has the lowest priority.

In addition, the post-integration QoS level "2" is indicated to correspond to the QoS level "1" in the terminal B (terminal 200-2). That is, it indicates that the post-integration QoS level of the message of the QoS level "1" transmitted by the terminal B is "2". As described above, in the case of FIG. 4, the message of the QoS level "2" transmitted by the terminal B has a higher priority than the message of the QoS level "1" transmitted by the terminal A.

In addition, the post-integration QOS level "6" is indicated to correspond to the QoS level "3" in the terminal B (terminal 200-2). That is, it indicates that the post-integration QoS level of the message of the QoS level "3" transmitted by the terminal. B is "6". As described above, in the case of FIG. 4, the message of the QoS level "3" transmitted by the terminal B has the highest priority.

Note that the above is an example, and the integrated QoS information storage unit 141 is not limited to the above, and may store various types of information depending on the purpose.

The communication parameter information storage unit 142 according to the first embodiment stores various types of information regarding the communication parameters. The communication parameter information storage unit 142 stores wireless communication parameters set on the basis of the integrated QoS. FIG. 5 is a diagram illustrating an example of a communication parameter information storage unit according to the first embodiment. The integration communication parameter information storage unit 142 illustrated in FIG. 5 includes items such as "post-integration QoS level" and "wireless communication parameter". The "wireless communication parameter" includes items such as "transmission power", "allocated frequency resource (the number of resource blocks)", and "coding rate". Note that the "wireless communication parameter" is not limited to the above, and may include various items such as "communication timing", "packet error rate", and "communication delay". The "post-integration QoS level" indicates a QoS level after integration. The "wireless communication parameter" indicates a parameter corresponding to each post-integration QoS level. The "transmission power" indicates transmission power when a message of a corresponding post-integration QoS level is transmitted. The "transmission power" is a value corresponding to a predetermined unit such as watt (W). The "allocated frequency resource (the number of resource blocks)" indicates an allocated frequency resource when a message of a corresponding post-integration QoS level is transmitted. The "coding rate" indicates a coding rate when a message of a corresponding post-integration QoS level is transmitted.

In the example of FIG. 4, the post-integration QoS level "1" indicates that the transmission power is "30", the allocated frequency resource is "100", and the coding rate is "0.9". As described above, in the case of FIG. 4, the message of the post-integration QoS level "1" indicates that the transmission power is the smallest, the allocated frequency resources are small, and the coding rate is poor.

The post-integration QoS level "2" indicates that the transmission power is "32", the allocated frequency resource is "200", and the coding rate is "0.7". As described above, in the case of FIG. 4, it is indicated that the message of the post-integration QoS level "2" has larger transmission power, more allocated frequency resources, and a better coding rate than the message of the post-integration QoS level "1".

Note that the above is an example, and the communication parameter information storage unit 142 is not limited to the above, and may store various types of information depending on the purpose.

Referring back to FIG. 3, the description will be continued. The control unit 150 is realized by, for example, a central processing unit (CPU), a micro processing unit (MPU), or the like executing a program (for example, a communication control program or a decision program according to the present disclosure) stored inside the base station 100 using a random access memory (RAM) or the like as a work area. In addition, the control unit 150 may be realized by, for example, an integrated circuit such as an application specific integrated circuit (ASIC) or a field programmable gate array (FPGA).

As illustrated in FIG. 3, the control unit 150 includes an acquisition unit 151, a communication control unit 152, and a decision unit 153, and realizes or executes a function or an operation of information processing described below. Note that the internal configuration of the control unit 150 is not limited to the configuration illustrated in FIG. 3, and may be another configuration as long as information processing to be described below is performed.

The acquisition unit 151 acquires various types of information. The acquisition unit 151 acquires various types of information from an external information processing apparatus. The acquisition unit 151 acquires various types of information from the storage unit 140. The acquisition unit 151 stores the acquired information in the storage unit 140. The acquisition unit 151 acquires the communication policy information decided by QoS information based on device information indicating the type of a medical device and transmission information indicating the type of a transmission content transmitted by the medical device.

The communication control unit 152 controls communication. The communication control unit 152 controls communication by the communication unit 120. The communication control unit 152 controls communication by the communication unit 120 on the basis of the information stored in the storage unit 140. The communication control unit 152 controls communication by the communication unit 120 according to the decision by the decision unit 153.

The communication control unit 152 controls communication between other apparatuses. The communication control unit 152 controls communication between external information processing apparatuses. The communication control unit 152 controls communication between the terminals 200. The communication control unit 152 controls communication between the terminals 200 on the basis of the information stored in the storage unit 140. The communication control unit 152 controls communication between the terminals 200 on the basis of the information acquired by the acquisition unit 151. The communication control unit 152 controls wireless communication between medical devices on the basis of the communication policy information.

The communication control unit 152 controls wireless communication on the basis of the communication policy information. The communication control unit 152 controls wireless communication in a communication mode decided on the basis of the communication policy information. The communication control unit 152 controls wireless communication with a communication timing based on the communication policy information. The communication control unit 152 controls wireless communication with a packet error rate based on the communication policy information. The communication control unit 152 controls the wireless communication by lowering the packet error rate as the priority is higher. The communication control unit 152 controls wireless communication with a communication delay based on the communication policy information. The communication control unit 152 controls the wireless communication while reducing the delay as the priority is higher.

The communication control unit 152 controls wireless communication with an allocated frequency based on the communication policy information. The communication control unit 152 controls the wireless communication by increasing the amount of frequency allocation as the priority is higher. The communication control unit 152 controls wireless communication with transmission/reception strength based on the communication policy information. The communication control unit 152 controls the wireless communication by increasing the transmission/reception strength as the priority is higher. The communication control unit 152 controls the wireless communication by increasing the transmission power as the priority is higher. The communication control unit 152 controls wireless communication with a coding rate based on the communication policy information.

The communication control unit 152 controls wireless communication of a message on the basis of the QoS decided by the decision unit 153. The communication control unit 152 controls wireless communication of a message on the basis of the QoS level decided by the decision unit 153.

The decision unit 153 decides various types of information. The decision unit 153 determines various types of information. For example, the decision unit 153 decides various types of information on the basis of information from an external information processing apparatus or information stored in the storage unit 120. The decision unit 153 determines various types of information on the basis of information from an external information processing apparatus or information stored in the storage unit 120. The decision unit 153 generates various types of information on the basis of information from an external information processing apparatus or information stored in the storage unit 120. The decision unit 153 decides various types of information on the basis of the various types of information acquired by the acquisition unit 131.

The decision unit 153 decides the communication policy information by QoS information based on device information indicating the type of a medical device and transmission information indicating the type of a transmission content transmitted by the medical device. The decision unit 153 decides the communication policy information by QoS information based on transmission information that is information indicating a type of traffic. The decision unit 153 decides the communication policy information by QoS information based on transmission information that is information indicating a use of traffic. The decision unit 153 decides the communication policy information by QoS information based on transmission information that is information indicating a pattern of traffic.

The decision unit 153 decides the communication policy information by QoS information based on transmission information that is information indicating a size of traffic. The decision unit 153 decides the communication policy information by QoS information based on transmission information that is information indicating a buffer amount of traffic. The decision unit 153 decides the communication policy information by QoS information based on transmission information that is information indicating a delay request value of traffic. The decision unit 153 decides the communication policy information by QoS information based on transmission information that is information indicating a reliability request value of traffic. The decision unit 153 decides the communication policy information by QoS information based on transmission information that is information indicating a reliability request value of traffic. The decision unit 153 decides the communication policy information by QoS information based on transmission information that is information indicating a cycle of traffic.

The decision unit 153 determines a type of a message to be transmitted to another apparatus, and decides the QoS of the message. The decision unit 153 decides the QoS of the message by image recognition. The decision unit 153 decides the QoS of the message on the basis of header information of the message. The decision unit 153 decides the QoS of the message on the basis of metadata of the message. The decision unit 153 decides the QoS of the message on the basis of information regarding digital imaging and communications in medicine (DICOM) of the message. The decision unit 153 decides the QoS level of the message.

[1-4. Configuration of the Terminal According to the First Embodiment]

Figures 6, 7:
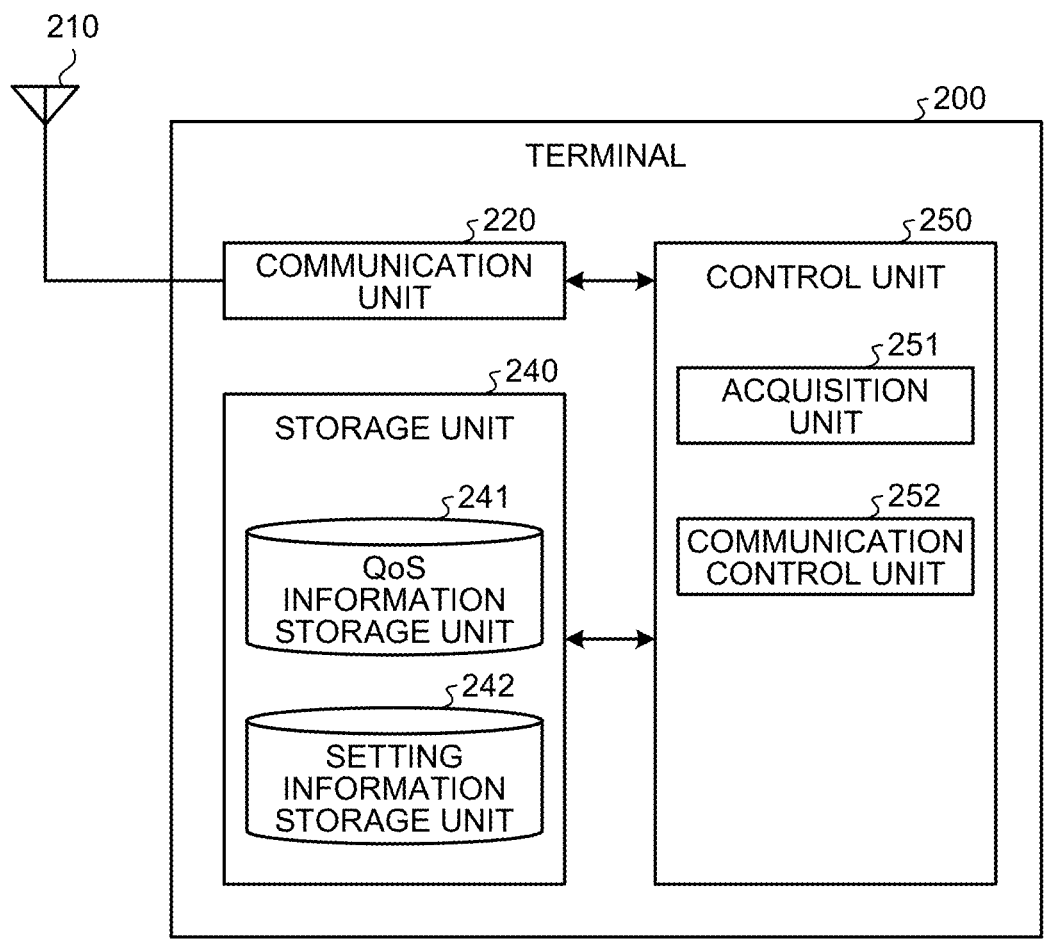
FIG. 6 is a diagram illustrating a configuration example of a terminal according to the first embodiment.
FIG. 7 is a diagram illustrating an example of a QoS information storage unit according to the first embodiment.

Next, a configuration of the terminal 200, which is an example of the wireless terminal apparatus that executes the communication control processing according to the first embodiment, will be described. FIG. 6 is a diagram illustrating a configuration example of a terminal according to the first embodiment. Note that FIG. 6 illustrates only a configuration related to the communication control processing among the configurations of the terminal 200. For example, among the configurations of the terminal 200, which is a medical device, illustration of a configuration related to a display function of a monitor, a measurement function of a sphygmomanometer, and the like is omitted.

As illustrated in FIG. 6, the terminal 200 includes an antenna unit 210, a communication unit 220, a storage unit 240, and a control unit 250.

The antenna unit 210 radiates a signal output from the communication unit 220 into a space as a radio wave. In addition, the antenna unit 210 converts a radio wave in a space into a signal and outputs the signal to the communication unit 220. For example, the antenna unit 210 includes an antenna used for wireless communication.

The communication unit 220 transmits and receives signals. For example, the communication unit 220 receives a downlink signal from the base station 100 and transmits an uplink signal to the base station 100. The communication unit 220 performs wireless communication with a medical device arranged in a space of a medical institution. The communication unit 220 performs wireless communication with a medical device arranged in an operating room.

The communication unit 220 is realized by, for example, a NIC, a communication circuit, or the like. The communication unit 220 transmits and receives information to and from the base station 100 by wireless communication.

The storage unit 240 is realized by, for example, a semiconductor memory element such as a random access memory (RAM) or a flash memory, or a storage apparatus such as a hard disk or an optical disk. The storage unit 240 includes a QoS information storage unit 241 and a setting information storage unit 242. Although illustration omitted, the setting information storage unit 242 stores various types of information regarding the setting. The setting information storage unit 242 stores the communication policy information. The setting information storage unit 242 stores information indicating the wireless communication parameters as the communication policy information. Note that the storage unit 240 stores not only the information indicated in the QoS information storage unit 241 or the setting information storage unit 242, but also various types of information. The storage unit 240 may store information received from another terminal 200 or the base station 100.

The QoS information storage unit 241 according to the first embodiment stores QoS information of its own apparatus (terminal 200). The QoS information storage unit 241 stores various types of information regarding QoS corresponding to transmission of its own apparatus (terminal 200). FIG. 7 is a diagram illustrating an example of a QoS information storage unit according to the first embodiment. The QoS information storage unit 241 illustrated in FIG. 7 includes items such as "QoS level" and "transmission content".

The "QoS level" indicates a QoS level. The "transmission content" indicates the content of data to be transmitted by the corresponding QoS. Note that, in the example of FIG. 7, the "transmission content" is illustrated at an abstract sign such as "INF1", but the "transmission content" includes various types of information (transmission information) regarding the transmission content.

In the example of FIG. 7, the QoS level "1" indicates that the transmission content is "INF1". In addition, the QoS level "2" indicates that the transmission content is "INF2".

Note that the above is an example, and the QoS information storage unit 241 is not limited to the above, and may store various types of information depending on the purpose.

Referring back to FIG. 6, the description will be continued. The control unit 250 is realized by, for example, a CPU, an MPU, or the like executing a program (for example, a communication control program according to the present disclosure) stored in the terminal 200 using a RAM or the like as a work area. In addition, the control unit 250 may be realized by, for example, an integrated circuit such as an ASIC or an FPGA.

As illustrated in FIG. 6, the control unit 250 includes an acquisition unit 251 and a communication control unit 252, and realizes or executes a function or an operation of information processing described below. Note that the internal configuration of the control unit 250 is not limited to the configuration illustrated in FIG. 6, and may be another configuration as long as information processing to be described below is performed.

The acquisition unit 251 acquires various types of information. The acquisition unit 251 acquires various types of information from an external information processing apparatus. The acquisition unit 251 acquires various types of information from the storage unit 240. The acquisition unit 251 stores the acquired information in the storage unit 240. The acquisition unit 251 acquires the communication policy information decided by QoS information based on device information indicating the type of a medical device and transmission information indicating the type of a transmission content transmitted by the medical device.

The communication control unit 252 controls communication. The communication control unit 252 controls communication by the communication unit 220. The communication control unit 252 controls communication by the communication unit 220 on the basis of the information stored in the storage unit 240.

The communication control unit 252 controls wireless communication with a medical device according to control by the base station 100. The communication control unit 252 controls wireless communication on the basis of the communication policy information set by the base station 100.

The communication control unit 252 controls wireless communication on the basis of the communication policy information. The communication control unit 252 controls wireless communication in a communication mode decided on the basis of the communication policy information. The communication control unit 252 controls wireless communication with a communication timing based on the communication policy information. The communication control unit 252 controls wireless communication with a packet error rate based on the communication policy information. The communication control unit 252 controls the wireless communication by lowering the packet error rate as the priority is higher. The communication control unit 252 controls wireless communication with a communication delay based on the communication policy information. The communication control unit 252 controls the wireless communication while reducing the delay as the priority is higher.

The communication control unit 252 controls wireless communication with an allocated frequency based on the communication policy information. The communication control unit 252 controls the wireless communication by increasing the amount of frequency allocation as the priority is higher. The communication control unit 252 controls wireless communication with transmission/reception strength based on the communication policy information. The communication control unit 252 controls the wireless communication by increasing the transmission/reception strength as the priority is higher. The communication control unit 252 controls the wireless communication by increasing the transmission power as the priority is higher. The communication control unit 252 controls wireless communication with a coding rate based on the communication policy information.

[1-5. Procedure of the Communication Control Processing According to the First Embodiment]

Figure 8:
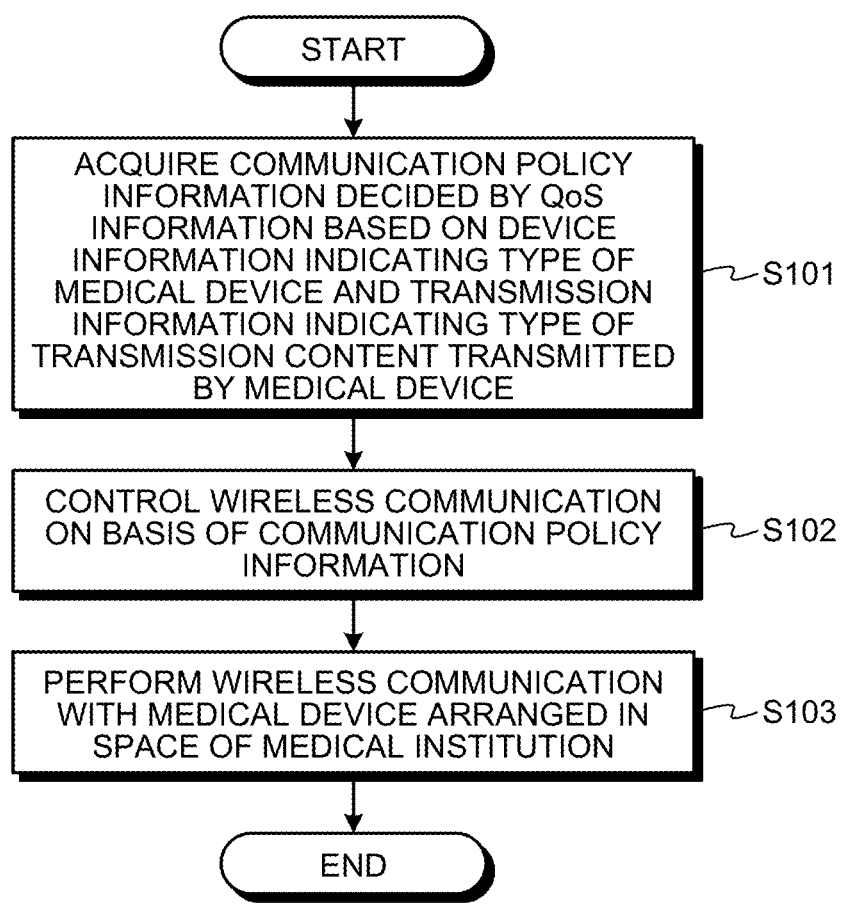
FIG. 8 is a flowchart illustrating a procedure of communication control processing according to the first embodiment.
Figure 9:
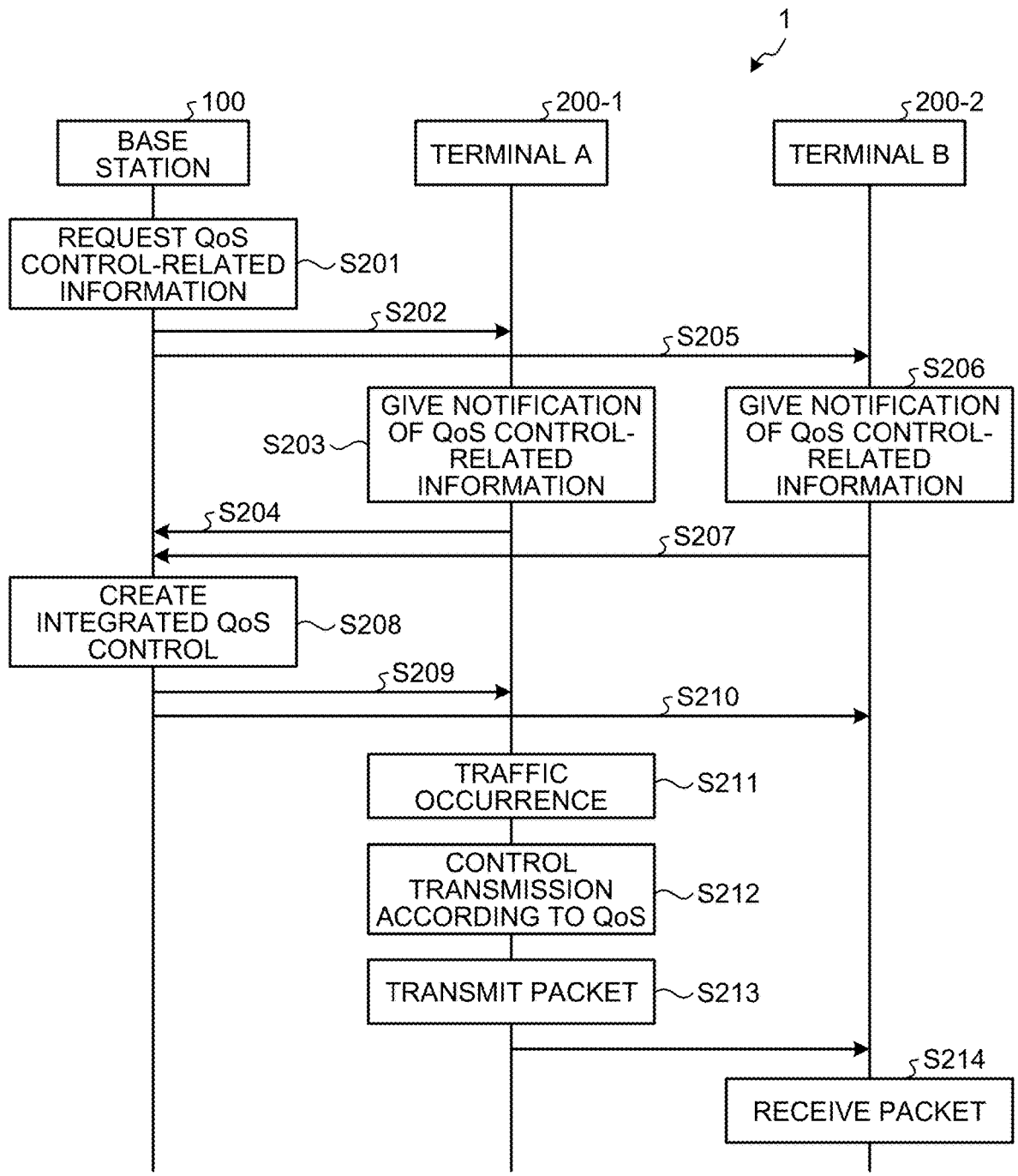
FIG. 9 is a sequence diagram illustrating a procedure of communication control processing according to the first embodiment.

Next, a procedure of the communication control processing according to the first embodiment will be described with reference to FIGS. 8 and 9. First, a flow of learning processing according to the first embodiment will be described with reference to FIG. 8. FIG. 8 is a flowchart illustrating a procedure of communication control processing according to the first embodiment.

As illustrated in FIG. 8, the terminal 200 acquires the communication policy information decided by QoS information based on device information indicating the type of a medical device and transmission information indicating the type of a transmission content transmitted by the medical device (Step S101). For example, the terminal 200 acquires the communication policy information from the base station 100.

The terminal 200 controls the wireless communication on the basis of the communication policy information (Step S102). The terminal 200 controls wireless communication on the basis of the acquired transmission power, allocated frequency resources, coding rate, and the like. Then, the terminal 200 performs wireless communication with a medical device arranged in a space of a medical institution (Step S103). The terminal 200 transmits a message of a message type with the transmission power, the allocated frequency resources, the coding rate, or the like corresponding to the message type.

Next, the entire processing flow will be described with reference to FIG. 9. FIG. 9 is a sequence diagram illustrating a procedure of communication control processing according to the first embodiment.

First, control related to the QoS is performed on the base station 100 side. The base station 100 requests the terminal 200-1, which is the terminal A, and the terminal 200-2, which is the terminal B, to collect information related to the QoS (Step S201). For example, the base station 100 transmits a notification of request for QoS control-related information, and obtains the QoS control-related information from each terminal 200. The base station 100 transmits a notification of request for QoS control-related information to the terminal 200-1 (Step S202). Thus, the base station 100 gives a notification of request for QoS control-related information to the terminal 200-1 (Step S203). In response to the request notification, the terminal 200-1 notifies the base station 100 of QoS-related information held in the terminal 200-1 as the QoS control-related information (Step S204). For example, when the message type to be transmitted on the terminal 200-1 side is decided, the terminal 200-1 transmits the message and the priority information (QoS information) corresponding to each message to the base station 100.

In addition, the base station 100 transmits a notification of request for QoS control-related information to the terminal 200-2 (Step S205). Thus, the base station 100 gives a notification of request for QoS control-related information to the terminal 200-2 (Step S206). In response to the request notification, the terminal 200-2 notifies the base station 100 of QoS-related information held in the terminal 200-2 as the QoS control-related information (Step S207). Note that the base station 100 may simultaneously notify the terminal 200-1 and the terminal 200-2 of the request for the QoS control-related information, or may notify the terminal 200-2 of the request for the QoS control-related information prior to the terminal 200-1.

Then, the base station 100 creates integrated QoS control (Step S208). The base station 100 associates the type of traffic generated in each device (terminal 200) with wireless communication control corresponding to each traffic, and creates integrated QoS control unified in the system. For example, the base station 100 decides an integrated QoS level and a wireless communication parameter. Then, the base station 100 creates the information indicated in the integrated Qos information storage unit 121 or the information indicated in the communication parameter information storage unit 122 as integrated QoS control.

Then, the base station 100 transmits the integrated QoS control to the terminal 200-1 (Step S209). The base station 100 transmits information indicating the integrated QoS level or the wireless communication parameter to the terminal 200-1. Thus, the terminal 200-1 acquires the integrated QoS control indicating the integrated QoS level or the wireless communication parameter. The base station 100 transmits the integrated QoS control to the terminal 200-2 (Step S210). The base station 100 transmits information indicating the integrated QoS level or the wireless communication parameter to the terminal 200-2. Thus, the terminal 200-2 acquires the integrated Qos control indicating the integrated QoS level or the wireless communication parameter.

Then, when traffic occurs (Step S211), the terminal 200-1 performs transmission control according to the QoS (Step S212). The terminal 200-1 performs communication control by using setting information such as wireless communication parameters set for each QoS level. The terminal 200-1 transmits a packet using wireless communication parameters such as transmission power, allocated frequency resources, and a coding rate corresponding to the packet to be transmitted (Step S213). Then, the terminal 200-2 receives the packet from the terminal 200-1 (Step S214). Note that, in the example of FIG. 9, direct communication between the terminals 200 is illustrated as an example, but communication via the base station 100 is also processed in a similar manner.

[1-6. Overview of the Communication Control System]

As described above, the communication control system 1 integrates the QoS levels (ranks) of each wireless traffic (packet) between a plurality of devices (terminals 200) and controls the wireless link according to the QoS level. As an example of the QoS level (rank), a level (rank) directly related to human life is set to be the highest, a level (rank) related to human life but having no significant influence is set to be the next highest, and a level (rank) not related to human life is set to be the lowest. For example, in a case where a smaller value is set as the importance level is higher, the level (rank) directly related to human life is set to "1", the level (rank) related to human life but having no significant influence is set to "2", and the level (rank) not related to human life is set to "3". In addition, for example, in a case where a larger value is set as the importance level is higher, the level (rank) directly related to human life is set to "3", the level (rank) related to human life but having no significant influence is set to "2", and the level (rank) not related to human life is set to "1". Note that the setting values of the levels (ranks) described above are an example, and various values may be set according to the number of levels (ranks) or the like.

In addition, as an example of the wireless communication control, the communication control system 1 performs control according to the priority of the wireless link according to QoS, robust communication of communication with high priority, space-time-frequency resource allocation, transmission power control, modulation/demodulation control, and the like. In addition, the communication control system 1 may perform, as wireless communication control, refraining from transmitting communication with low priority, time-frequency resource management, spatial interference control, and the like.

Here, a specific example of the processing illustrated in FIG. 9 will be described. For example, the base station 100 transmits a QoS control-related information request to the terminal A, which is a monitor, or the terminal B, which is a sphygmomanometer. The terminals A and B notify the base station 100 of the QoS control-related information in response to the request from the base station 100. The terminal A transmits information of a video monitor to another monitor and transmits packet message types related to monitor data and respective pieces of priority information to the base station 100. In addition, the terminal B transmits real-time data of the sphygmomanometer and transmits packet message types related to the sphygmomanometer and respective pieces of priority information to the base station 100. On the base station 100 side, the integrated QoS table is created using the obtained message type and priority information, and the control of the wireless communication is performed.

For example, it is assumed that the terminal A handles transmission of monitor information and the terminal B transmits electrocardiogram information to the server side. In this case, the base station 100 side grasps the content of the message from the control information and the data information of the terminal A and the terminal B, and recognizes that the monitor-related information and the electrocardiogram information are transmitted. In response to this, the integrated QoS table is created on the base station 100 side, and the control of the wireless communication is performed.

[1-6-1. Integrated QoS Level]

The base station 100 that has obtained the QoS control-related information creates the integrated QoS control table as illustrated in FIG. 4. For example, the base station 100 collectively imparts a Qos level (importance level) to the QoS control-related information in each device (terminal 200), and controls the wireless communication traffic according to each importance level. For example, information such as the importance levels 1, 2, and 3 is sent from a device #1 (terminal A). Note that the higher the numerical value, the higher the importance. In addition, information such as the importance levels 1, 2, and 3 is sent from a device #2 (terminal B). In this case, the base station 100 uses various types of information to decide an integrated importance level (integrated QoS level) as illustrated in FIG. 4.

[1-6-2. Wireless Communication Parameter]

The base station 100 creates a table for deciding a method of controlling the wireless communication parameter according to the QoS level after integration. The base station 100 decides wireless communication parameters as illustrated in FIG. 5. Note that, regarding transmission power and resources, it is assumed that better parameters are allocated as the number is larger. Regarding coding rate, a small numerical value is a parameter with which good performance can be obtained.

Note that a setting policy for the QoS level after integration, a setting policy for the QoS level after integration and the parameter allocation of wireless communication, and the like may be separately controlled by different policy control entities. For example, controllable wireless communication parameters described below may be targets. The communication control system 1 may perform link switching of base station-to-terminal communication and terminal-to-terminal communication, time-frequency resource allocation, and use band switching. For example, the communication control system 1 may switch the use band from 2.4 GHz to 5 GHz. In addition, the communication control system 1 may switch the use band from an unlicensed frequency band to a licensed frequency band. The communication control system 1 may switch the use band from a licensed frequency band to an unlicensed frequency band.

In addition, the communication control system 1 may switch a transmission method (Tx diversity, multiple input multiple output (MIMO) transmission, beamforming weight change). For example, the communication control system 1 may perform link coordination. For example, the communication control system 1 may temporarily stop communication and secure a resource of a link to be prioritized.

In addition, the communication control system 1 may change modulation and a coding rate. The change of modulation herein may be switching of quadrature phase shift keying (QPSK), 16 quadrature amplitude modulation (QAM), or the like.

In addition, the communication control system 1 may change the transmission power. For example, the communication control system 1 may switch a transmission module. When there is a plurality of modules, the communication control system 1 switches a transmission point using a specific module. The switching of transmission point includes switching of a distributed transmission point, physical antenna switching, and the like. The switching of transmission point includes various methods for realizing spatial diversity.

In addition, the communication control system 1 may notify a system user of an alert in a case where the communication quality is not likely to be satisfied by any control described above. Display and make people aware of the display.

After creating the QoS control table, the communication control system 1 performs setting on each terminal 200 and controls the wireless communication parameters according to each traffic. When traffic is generated in the terminal A, the terminal A performs setting of parameters for wireless communication by using the generated traffic and the set integrated QoS control table. After setting parameters for wireless communication, packet transmission is performed to achieve transmission and reception with the terminal B.

The communication control system 1 may create the QoS table by including not only wireless communication traffic but also existing wired traffic such as DICOM. The control of the wireless communication parameter by the communication control system 1 may be to relatively control the parameter according to the QoS status of another communication link. For example, in a case where there are three links and two of the three links are packets with very high QoS, control may be performed such that packet transmission of the remaining one link with low QoS is performed by multiplying a predetermined parameter by a predetermined weight value (weight A or the like) and performing communication with lower performance. In addition to this, additional control for the wireless communication parameters may be performed using the congestion level of bands, the interference information from a specific link, and the like, and this point will be described below in detail.

[1-6-3. QoS-Related Information]

The QoS-related information may include various types of information. For example, the QoS-related information may include information such as transmission information. The transmission information may include various types of information related to traffic such as information indicating a type of traffic and information indicating a use of traffic. For example, the transmission information may include information indicating whether the type of traffic is a voice, a video, or the like. For example, the transmission information may include information indicating whether the use of traffic is important data communication, backup processing, or the like.

In addition, in the above example, the terminal 200 notifies the base station 100 of the QoS-related information in response to the request from the base station 100, but the base station 100 and the terminal 200 may acquire the QoS-related information by various means. For example, the base station 100 and the terminal 200 may acquire the QoS-related information such as the QoS information by analyzing the transmission control information, the data traffic, and the information of the packet from the terminal 200 side on the base station 100 side without transmitting the notification of request for the QoS control-related information.

For example, the base station 100 and the terminal 200 may acquire the QoS control-related information by determining or extracting information. The base station 100 and the terminal 200 may extract the QoS information from information related to data traffic. The base station 100 and the terminal 200 may use information described below for specifying the QoS information. The base station 100 and the terminal 200 may extract the QoS information from information indicating what kind of traffic is present, such as a traffic type, a traffic pattern, and a traffic cycle. For example, the base station 100 and the terminal 200 may extract the QoS information from the characteristic of transmission timing on time axis such as periodic, aperiodic, or event trigger.

In addition, the base station 100 and the terminal 200 may extract the Qos information from information related to a use of traffic and a sent message. For example, the base station 100 and the terminal 200 may read a data signal (message information) transmitted in a header of a packet or the like and specify the use of the traffic on the basis of the read information. The base station 100 and the terminal 200 may estimate the QoS information from a traffic pattern (periodic, aperiodic, event trigger), a traffic size, and a sent data size. For example, the base station 100 and the terminal 200 may handle large data as important data. For example, the base station 100 and the terminal 200 may determine that the larger the capacity of data, the higher the importance.

In addition, the base station 100 and the terminal 200 may determine (specify) the QOS information on the basis of the buffer amount of the traffic. For example, information such as buffer status report may be sent from the terminal 200 on the transmission side to the terminal 200 on the reception side to give a notification as to how much traffic is accumulated on the transmission side. Thus, for example, when there is a large amount of buffer, the base station 100 and the terminal 200 may preferentially process the traffic as data with high QoS.

In addition, the base station 100 and the terminal 200 may determine (specify) the QoS information on the basis of the delay request value of the traffic. For example, the base station 100 and the terminal 200 add a delay request value of traffic to a packet header or the like, and determine the QoS on the basis of the information. For example, for example, the base station 100 and the terminal 200 may set a high Qos when the delay request is strict. In addition, the base station 100 and the terminal 200 may determine (specify) the QoS information on the basis of the reliability request value of the traffic. For example, the base station 100 and the terminal 200 may add a reliability request value to a packet header or the like, and determine the QoS on the basis of the information. For example, the base station 100 and the terminal 200 may set a high QoS when the reliability request value is high.

In addition, the base station 100 and the terminal 200 may determine (specify) the QoS information on the basis of the cycle of the traffic. For example, the traffic information may be quantified in advance as a score such as an importance level. The importance level may be used as QoS information in association with QoS. For example, a low value (for example, 2) of the importance level may be set for traffic such as monitor-to-monitor communication, and a high value (for example, 8) of the importance level may be set for traffic related to electric scalpel control.

In addition, for example, the QoS control-related information may be (semi-) statically exchanged or may be dynamically exchanged between the terminal 200 and the base station 100. In the case of dynamic exchange, a notification of the priority information (QoS information) of the packet and information such as the degree of priority in the terminal 200 may be given for each packet transmission. In the case of static exchange, the exchange may be performed once at power-on (startup) or the like, or in the case of semi-static exchange, the exchange may be performed periodically, for example, every several seconds.

[1-7. Conceptual Diagram of the Communication Control System]

Figure 10:
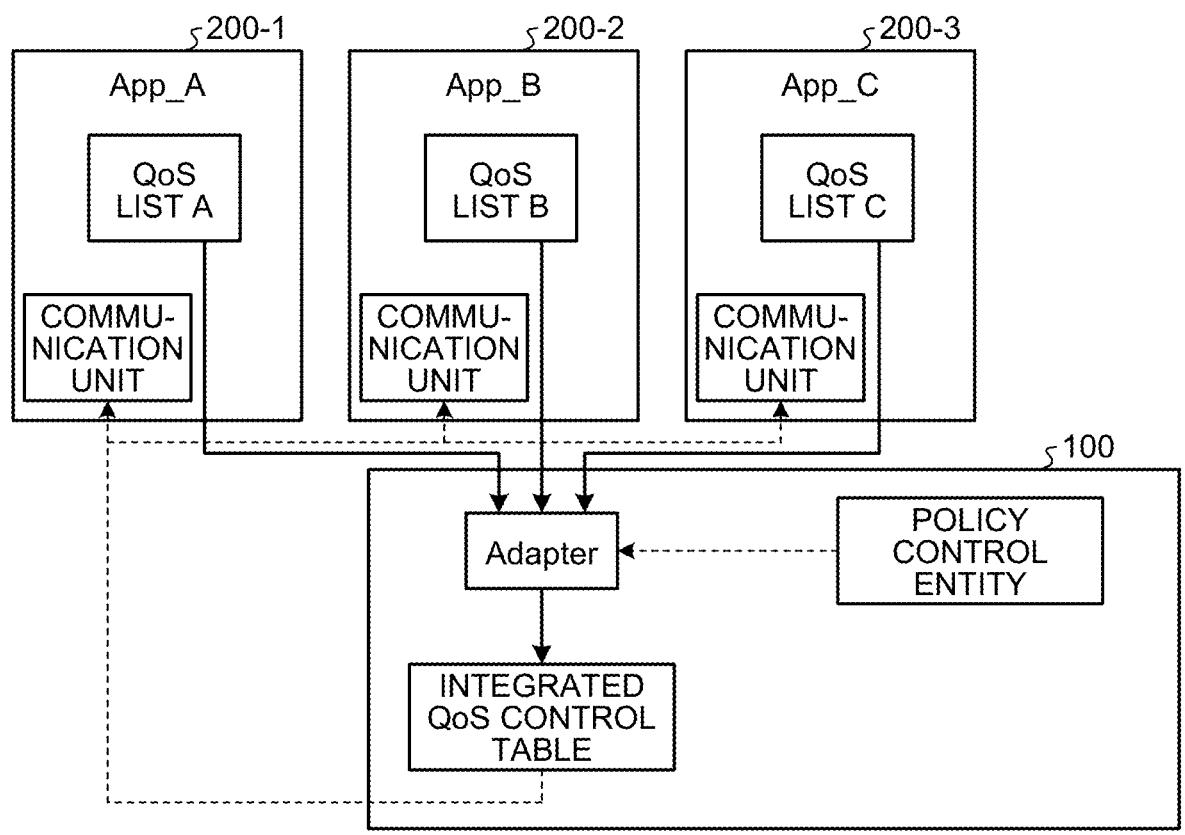
FIG. 10 is a conceptual diagram illustrating an example of a communication control system according to the first embodiment.

Here, each function, a hardware configuration, and data in the communication control system will be conceptually described with reference to FIG. 10. FIG. 10 is a conceptual diagram illustrating an example of a communication control system according to the first embodiment. Specifically, FIG. 10 is a conceptual diagram illustrating an example of the communication control system in a case where the integrated QoS control table is created on the base station 100 side. The communication control system illustrated in FIG. 10 corresponds to the communication control system 1 and includes the terminals 200-1 to 200-3 and the base station 100.

"Adapter" in the base station 100 indicates a function used to realize wireless communication control. For example, "Adapter" corresponds to a function for integrating QoS settings for each traffic. For example, the function of "Adapter" corresponds to the function of the decision unit 153 illustrated in FIG. 3.

"Policy control entity" in the base station 100 controls "Adapter" and creates an integrated QoS table from the QoS tables of the terminals 200-1 to 200-3. For example, the base station 100 corresponds to an entity that realizes a wireless communication link. The base station 100 generates the integrated QoS control table by "Adapter". The base station 100 controls communication of the terminals 200-1 to 200-3 using the integrated QoS control table.

As described above, in FIG. 10, the base station 100 creates a comprehensive QoS control table in the system according to the direction of the policy control entity by using QoS list information in each terminal 200. Each terminal 200 controls the communication unit according to the set integrated QoS control table and its own generated traffic, and performs wireless link control.

Note that "policy control entity" may change the configuration (setting) according to the situation. For example, "policy control entity" may change the setting according to surgery, surgery content, or operation. For example, "policy control entity" may change the setting according to the time or place or the user such as a doctor (operator). "Policy control entity" may be set for each doctor. For example, "policy control entity" may change the setting according to a device (terminal 200) in the network. For example, "policy control entity" may change the setting according to the type or number of terminals 200 in the network and available communication resources (frequency band and the like). For example, "policy control entity" may perform fixed operation or may dynamically change the setting.

2. Second Embodiment

In the first embodiment described above, the case where the base station 100 decides the integrated QoS level, the wireless communication parameter, and the like has been described, but the apparatus that decides the integrated QoS level, the wireless communication parameter, and the like is not limited to the base station, but may be another apparatus. In the second embodiment, the case where the server 300 decides the integrated QoS level, the wireless communication parameter, and the like will be described as an example. Note that description of the same points as those of the base station 100 and the terminal 200 according to the first embodiment will be omitted as appropriate.

[2-1. Overview of the Communication Control Processing According to the Second Embodiment of the Present Disclosure]

Figure 11:
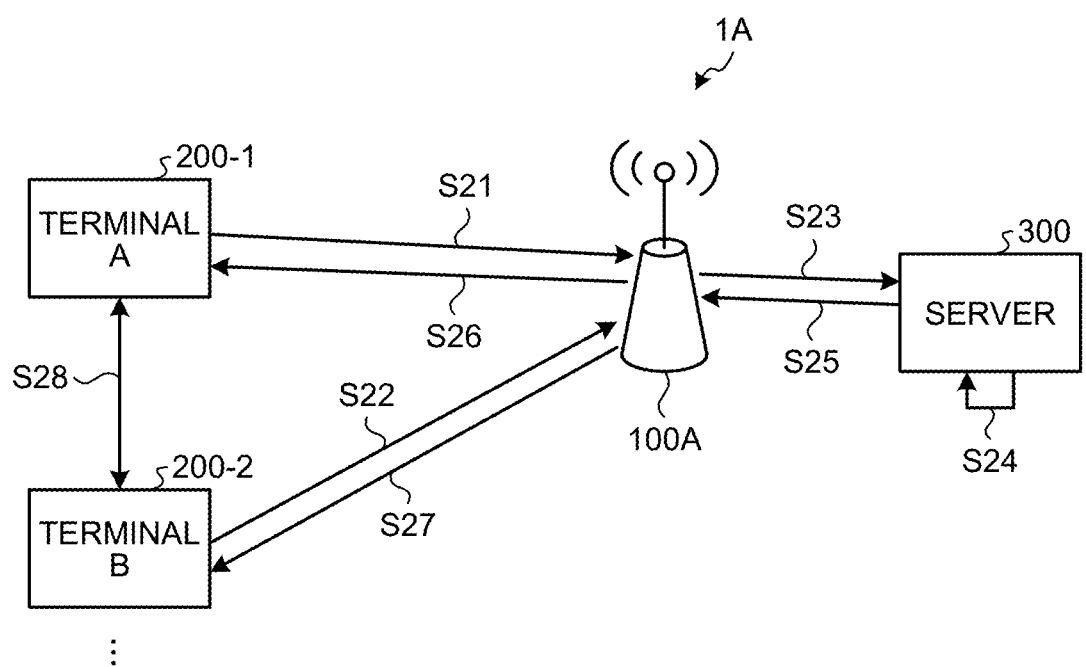
FIG. 11 is a diagram illustrating an example of communication control processing according to a second embodiment of the present disclosure.

First, an overview of the communication control processing according to the second embodiment will be described with reference to FIG. 11. FIG. 11 is a diagram illustrating an example of communication control processing according to the second embodiment of the present disclosure. A configuration of a communication control system 1A illustrated in FIG. 11 will be described. As illustrated in FIG. 11, the communication control system 1A includes a base station 100A and a plurality of terminals 200, and a server 300. The base station 100A is communicably connected to the server 300 by wire or wirelessly via a predetermined network N (the Internet or the like). The base station 100A transmits and receives information to and from the server 300.

The server 300 is an information processing apparatus used to provide a wireless communication service. The server 300 makes various decisions using the information acquired from the base station 100A. The server 300 decides integrated QoS levels and communication parameters. For example, the server 300 may be a core network such as an evolved packet core (EPC).

First, the base station 100A acquires information related to QoS control (QoS control-related information) from the terminal 200-1, which is the terminal A (Step S21). For example, the terminal 200-1 transmits three types of packet message types and respective pieces of priority information (see FIG. 7) to the base station. The terminal 200-1 transmits, to the base station, priority information indicating that the priority (QoS level) of monitor message type #1, is "1", the QoS level of monitor message type #2 is "2", and the QoS level of monitor message type #3 is "3".

In addition, the base station 100A acquires QoS control-related information from the terminal 200-2, which is the terminal B (Step S22). The terminal 200-2 transmits, to the base station, priority information indicating that the priority (QoS level) of sphygmomanometer message type #1 is "1", the QoS level of sphygmomanometer message type #2 is "2", and the QoS level of sphygmomanometer message type #3 is "3".

The base station 100A that has obtained the QoS control-related information transmits the QoS control-related information to the server 300 (Step 323). The base station 100A transmits the QoS control-related information acquired from the terminal 200-1 and the terminal 200-2 to the server 300.

The server 300 that has obtained the QoS control-related information creates an integrated QoS control table (Step S24). For example, the server 300 decides an integrated QoS level (importance level) on the basis of the QoS control-related information of the terminal 200-1 and the terminal 200-2. The server 300 decides the integrated QoS levels in which the monitor message type #1 is "1", the sphygmomanometer message type #1 is "2", the monitor message type #2 is "3", the sphygmomanometer message type #2 is "4", the monitor message type #3 is "5", and the sphygmomanometer message type #3 is "6".

In addition, the server 300 creates a table for deciding a method of controlling the wireless communication parameter according to the QoS level after integration (integrated QoS level). The server 300 decides the wireless communication parameter for each of the integrated QoS levels "1" to "6". The server 300 decides wireless communication parameters such as transmission power, allocated frequency resources, and a coding rate. The server 300 decides the wireless communication parameters such that the higher the integrated QoS level, the larger the transmission power, the larger the number of allocated frequency resources, and the better the coding rate.

Then, the server 300 transmits information indicating the decided integrated QoS level and wireless communication parameters to the base station 100A (Step S25). Then, the base station 100A that has acquired the information indicating the integrated QoS level and the wireless communication parameter from the server 300 transmits the information indicating the wireless communication parameter to the terminal 200-1 (Step S26). The base station 100A transmits information indicating the wireless communication parameters such as transmission power, allocated frequency resources, and a coding rate to the terminal 200-1. For example, the base station 100A transmits information indicating a message type corresponding to each integrated QoS level and information indicating the wireless communication parameters of each message type to the terminal 200-1. The terminal 200-1 acquires information indicating the wireless communication parameters as the communication policy information.

In addition, the base station 100A transmits information indicating the decided wireless communication parameters to the terminal 200-2 (Step S27). The base station 100A transmits information indicating the wireless communication parameters such as transmission power, allocated frequency resources, and a coding rate to the terminal 200-2. For example, the base station 100A transmits information indicating a message type corresponding to each integrated QoS level and information indicating the wireless communication parameters of each message type to the terminal 200-2. The terminal 200-2 acquires information indicating the wireless communication parameters as the communication policy information.

Then, the terminal 200 controls the wireless communication on the basis of the communication policy information (Step S28). Each terminal 200 controls wireless communication on the basis of the acquired communication policy information.

[2-2. Configuration of the Base Station and the Server According to the Second Embodiment]

Figure 12:
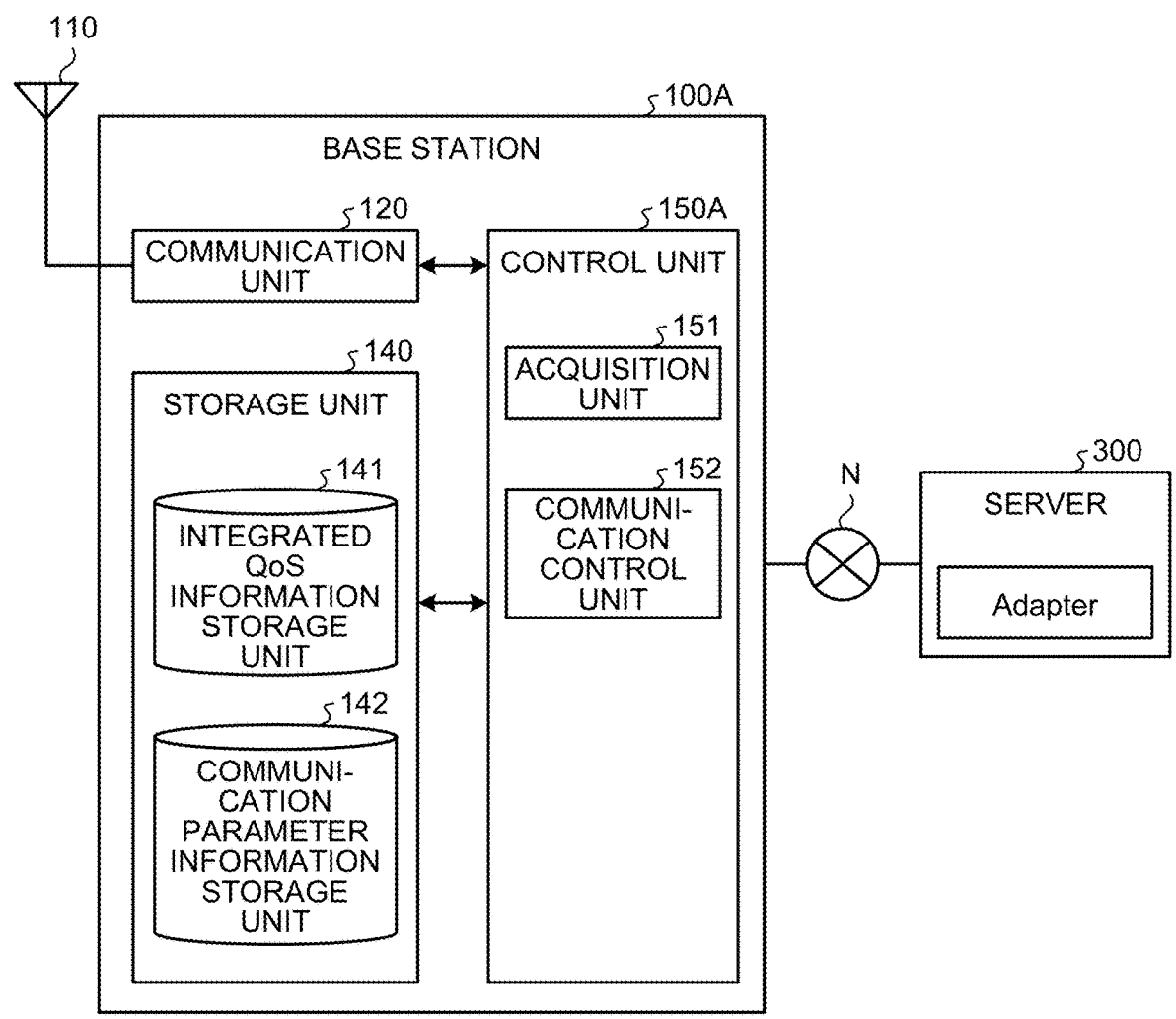
FIG. 12 is a diagram illustrating a configuration example of a base station and a server according to the second embodiment.

First, a configuration of the base station 100A that executes the communication control processing according to the second embodiment will be described. FIG. 12 is a diagram illustrating a configuration example of a base station and a server according to the second embodiment.

As illustrated in FIG. 12, the base station 100A includes a communication unit 120, a storage unit 140, and a control unit 150A. The communication unit 120 includes a network communication unit that communicates with an external information processing apparatus via a network N. The communication unit 120 communicates with the server 300 via the network N. In addition, the control unit 150A, which does not include the decision unit 153, is different from the control unit 150 of the base station 100. Similarly to the control unit 150, the control unit 150A is realized by, for example, a CPU, an MPU, or the like executing a program (for example, a communication control program according to the present disclosure) stored in the base station 100A using a RAM or the like as a work area. In addition, the control unit 150A may be realized by, for example, an integrated circuit such as an ASIC or an FPGA.

As illustrated in FIG. 12, the server 300 has a function of "Adapter". For example, "Adapter" in FIG. 12 has a function similar to that of "Adapter" in FIG. 10. The server 300 has the function of the decision unit 153 illustrated in FIG. 3.

The server 300 decides various types of information. The server 300 decides the communication policy information by QoS information based on device information indicating the type of a medical device and transmission information indicating the type of a transmission content transmitted by the medical device. The server 300 decides the communication policy information by QoS information based on transmission information that is information indicating a type of traffic. The server 300 decides the communication policy information by QoS information based on transmission information that is information indicating a use of traffic. The server 300 decides the communication policy information by QoS information based on transmission information that is information indicating a pattern of traffic.

The server 300 decides the communication policy information by QoS information based on transmission information that is information indicating a size of traffic. The server 300 decides the communication policy information by QoS information based on transmission information that is information indicating a buffer amount of traffic. The server 300 decides the communication policy information by QoS information based on transmission information that is information indicating a delay request value of traffic. The server 300 decides the communication policy information by QoS information based on transmission information that is information indicating a reliability request value of traffic. The server 300 decides the communication policy information by QoS information based on transmission information that is information indicating a reliability request value of traffic.

The server 300 decides the communication policy information by QoS information based on transmission information that is information indicating a cycle of traffic.

The server 300 determines a type of a message to be transmitted to another apparatus, and decides the QoS of the message. The server 300 decides the QoS of the message by image recognition. The server 300 decides the QoS of the message on the basis of header information of the message. The server 300 decides the QoS of the message on the basis of metadata of the message. The server 300 decides the QOS of the message on the basis of information related to DICOM of the message. The server 300 decides the QoS level of the message.

3. Third Embodiment

In the first embodiment and second embodiment described above, the case where the base station 100 or the server 300 decides the integrated QoS level, the wireless communication parameter, and the like has been described, but the wireless terminal apparatus may decide the integrated QoS level, the wireless communication parameter, and the like. Note that description of the same points as those of the base stations 100 and 100A and the terminal 200 described above will be omitted as appropriate.

[3-1. Overview of the Communication Control Processing According to the Third Embodiment of the Present Disclosure]

Figure 13:
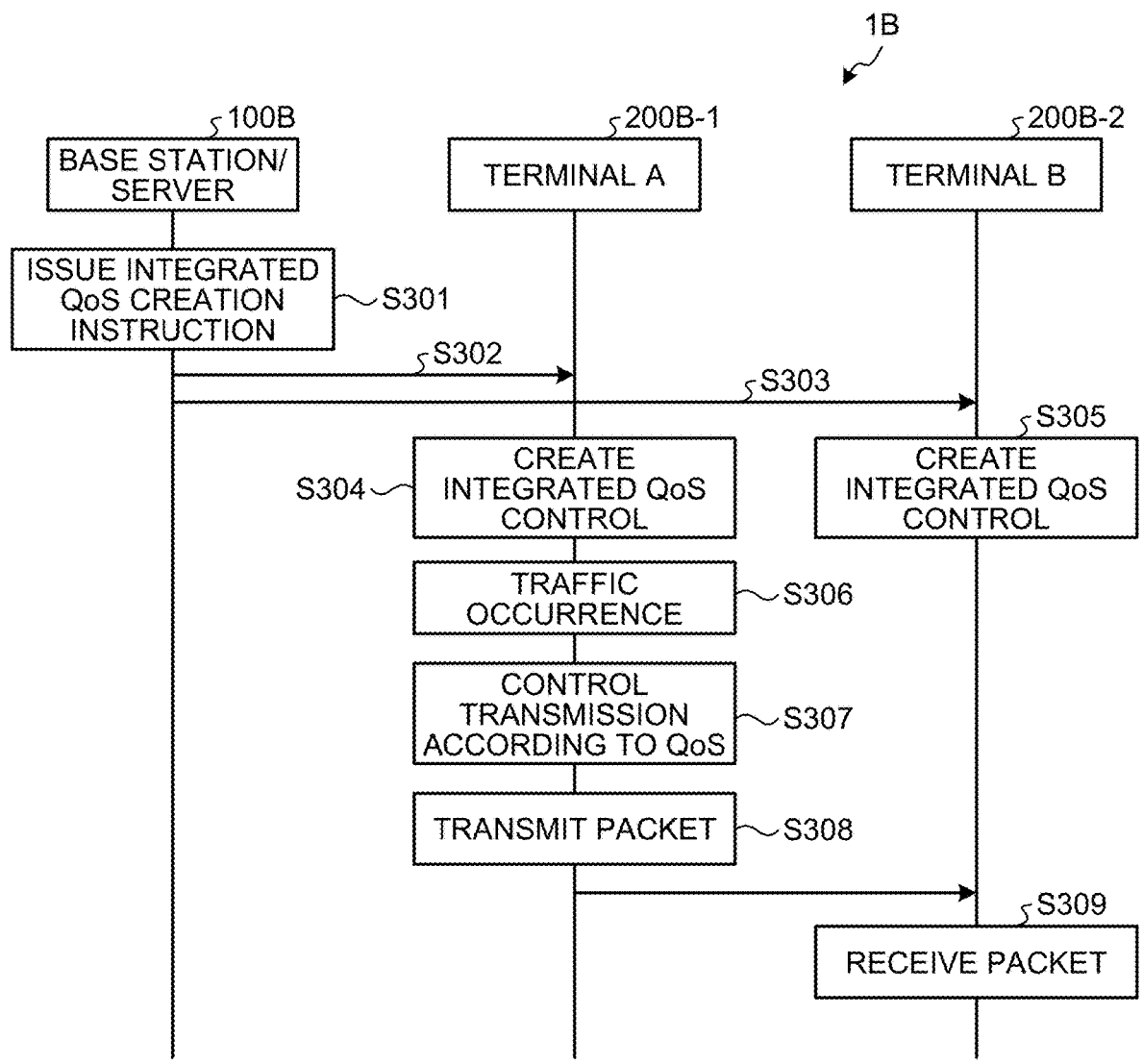
FIG. 13 is a diagram illustrating an example of communication control processing according to a third embodiment of the present disclosure.

First, an overview of the communication control processing according to the third embodiment will be described with reference to FIG. 13. FIG. 13 is a diagram illustrating an example of communication control processing according to the third embodiment of the present disclosure. Specifically, FIG. 13 is a sequence diagram illustrating a procedure of communication control processing according to the third embodiment. In addition, FIG. 13 is a diagram illustrating a configuration example of a communication control system 1B according to the third embodiment of the present disclosure.

First, a configuration of the communication control system 1B illustrated in FIG. 13 will be described. As illustrated in FIG. 13, the communication control system 1B includes a base station 100B and a plurality of terminals 200B. In the example of FIG. 13, only two terminals 200B: a terminal 200B-1, which is a terminal A, and a terminal 200B-2, which is a terminal B, are illustrated, but three or more terminals 200B are included. In addition, in a case where the terminals 200B-1 to 200B-2 and the like are described without being particularly distinguished, they are referred to as the terminal 200B.

Similarly to the terminal 200, the terminal 200B is a wireless terminal apparatus that performs wireless communication with a medical device arranged in a space of a medical institution. For example, the terminal 200B decides an integrated QoS level, a wireless communication parameter, and the like. Then, the terminal 200B performs communication by setting a transmission control parameter according to the integrated QoS table when traffic occurs from the integrated QoS control table and its own traffic.

Similarly to the base station 100 and the base station 100A, the base station 100B is an apparatus that provides a wireless communication service to the terminal 200B. The base station 100B is an apparatus used for communication between the terminals 200B. For example, the base station 100B may include the decision unit 153 like the base station 100, or may not include the decision unit 153 like the base station 100A.

Communication is performed between the base station 100B, the terminal 200B-1, and the terminal 200B-2 by wireless communication corresponding to a predetermined wireless communication system. Information is transmitted and received between the base station 100B and the terminal 200B by wireless communication corresponding to 5G. In addition, each terminal 200B transmits and receives information to and from another terminal 200B by wireless communication corresponding to 5G. Note that the communication control system 1B illustrated in FIG. 1.3 may include a plurality of base stations 100B. In addition, the communication control system 1B is not limited to the base station 100B or the terminal 200B, but may include various components. For example, the communication control system 1B may include components such as a server such as the server 300 illustrated in FIG. 11.

Hereinafter, a procedure of the communication control processing will be described. In the communication control system 1B, an integrated QoS creation instruction is issued from the base station 100B side to the terminals 200B-1 and 200B-2, and the QoS table in each terminal 200B is updated. The base station 100B issues an integrated QoS creation instruction to the terminals 200B-1 and 200B-2 (Step S301). The base station 100B side creates a table of traffic and communication control in each terminal 200B in advance, and sets the table in each terminal 200B. In the example of FIG. 13, the base station 100B creates a table of traffic and communication control in the terminal 200B, transmits the created information to the terminal 200B-1 (Step S302), and transmits the created information to the terminal 200B-1 (Step S303).

Then, in the terminal 200B, the wireless communication parameters are set by the set QoS control table and the traffic in the terminal 200B. For example, the terminal 200B creates the integrated QoS control. The terminal 200B-1 sets the wireless communication parameters by the set QoS control table and the traffic in the terminal 200B-1. For example, the terminal 200B-1 decides the integrated QoS level on the basis of the set QoS control table and the traffic in the terminal 200B-1, and decides the wireless communication parameter according to the decided integrated QoS level. The terminal 200B-1 decides an integrated QoS level, a wireless communication parameter, and the like. The terminal 200B-1 creates information of integrated QoS or information indicating the wireless communication parameter as the integrated QoS control (Step S304). In this case, when the traffic of the terminal 200B-1 does not correspond to the QoS control table, the terminal 200B-1 may report to the base station 100B side and request revision of the information (integrated QoS table, QoS control, table, or the like).

In addition, the terminal 200B-2 sets the wireless communication parameters by the set QoS control table and the traffic in the terminal 200B-2. For example, the terminal 200B-2 decides the integrated QoS level on the basis of the set QoS control table and the traffic in the terminal 200B-2, and decides the wireless communication parameter according to the decided integrated QoS level. The terminal 200B-2 decides an integrated QoS level, a wireless communication parameter, and the like. The terminal 200B-2 creates information of integrated QoS or information indicating the wireless communication parameter as the integrated QoS control (Step S305).

Note that not only each terminal 200B creates the integrated QoS control, but also a specific terminal 200B may create the integrated QoS control. For example, one terminal 200B may create the integrated QoS control and transmit the created integrated QoS control to each terminal 200B. In this case, like the base station 100, one terminal 200B may acquire the QoS-related information of each terminal 200, create the integrated QoS control, and transmit the created integrated QoS control to each terminal 200B. Note that details of a case where one terminal 200B creates integrated QoS control will be described below.

When traffic occurs (Step S306), the terminal 200B-1 performs transmission control according to the QoS (Step S307). The terminal 200B-1 performs communication control by using setting information such as wireless communication parameters set for each QoS level. The terminal 200B-1 transmits a packet using wireless communication parameters such as transmission power, allocated frequency resources, and a coding rate corresponding to the packet to be transmitted (Step S308). Then, the terminal 200B-2 receives the packet from the terminal 200B-1 (Step S309). Note that, in the example of FIG. 9, direct communication between the terminals 200B is illustrated as an example, but communication via the base station 100B is also processed in a similar manner.

[3-2. Configuration of the Terminal According to the Third Embodiment]

Figure 14:
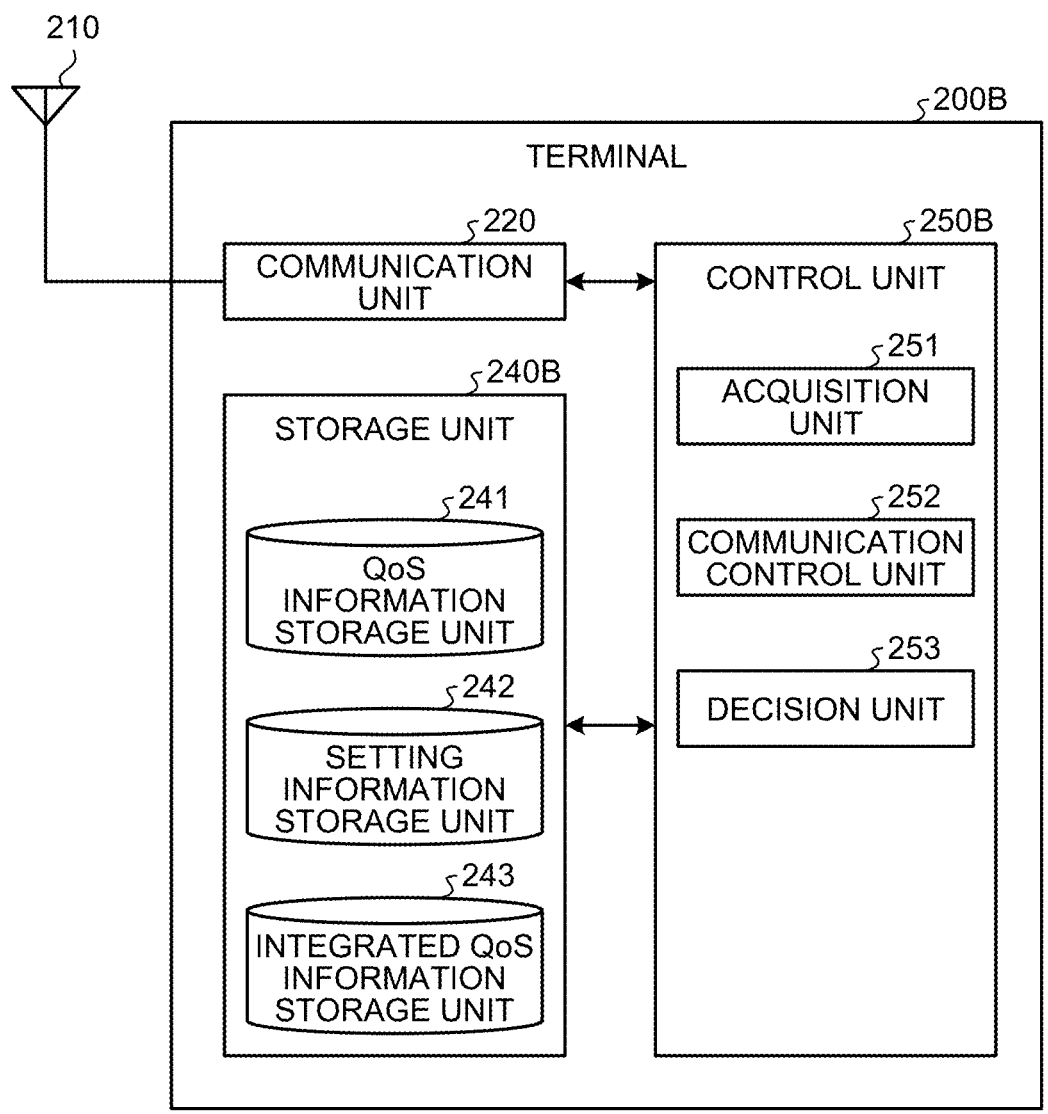
FIG. 14 is a diagram illustrating a configuration example of a terminal according to the third embodiment.

Next, a configuration of the terminals 200B, which is an example of the wireless terminal apparatus that executes the communication control processing according to the third embodiment, will be described. FIG. 14 is a diagram illustrating a configuration example of a terminal according to the third embodiment. As illustrated in FIG. 14, the terminal 200B includes a communication unit 220, a storage unit 240B, and a control unit 250B.

Similarly to the storage unit 240, the storage unit 240B is realized by, for example, a semiconductor memory element such as a RAM or a flash memory, or a storage apparatus such as a hard disk or an optical disk. The storage unit 240B includes a QoS information storage unit 241, a setting information storage unit 242, and an integrated QoS storage unit 243.

The integrated QoS information storage unit 243 according to the second embodiment stores integrated QoS information. Note that the information stored in the integrated Qos information storage unit 243 is similar to that in the integrated QoS information storage unit 141 illustrated in FIG. 4, and thus description thereof is omitted.

Similarly to the control unit 250, the control unit 250B is realized by, for example, a CPU, an MPU, or the like executing a program (for example, a communication control program according to the present disclosure) stored in the terminal 200B using a RAM or the like as a work area. In addition, the control unit 250B may be realized by, for example, an integrated circuit such as an ASIC or an FPGA.

As illustrated in FIG. 14, the control unit 250B includes an acquisition unit 251, a communication control unit 252, and a decision unit 253, and realizes or executes a function or an operation of information processing described below. Note that the internal configuration of the control unit 250 is not limited to the configuration illustrated in FIG. 14, and may be another configuration as long as information processing to be described below is performed.

The communication control unit 252 controls wireless communication of a message on the basis of the QoS decided by the decision unit 253. The communication control unit 252 controls wireless communication of a message on the basis of the QoS level decided by the decision unit 253.

The decision unit 253 decides the communication policy information by QoS information based on device information indicating the type of a medical device and transmission information indicating the type of a transmission content transmitted by the medical device. The decision unit 253 decides the communication policy information by QoS information based on transmission information that is information indicating a type of traffic. The decision unit 253 decides the communication policy information by QoS information based on transmission information that is information indicating a use of traffic. The decision unit 253 decides the communication policy information by QoS information based on transmission information that is information indicating a pattern of traffic. The decision unit 253 decides the communication policy information by QoS information based on transmission information that is information indicating a size of traffic.

The decision unit 253 decides the communication policy information by QoS information based on transmission information that is information indicating a buffer amount of traffic. The decision unit 253 decides the communication policy information by QoS information based on transmission information that is information indicating a delay request value of traffic. The decision unit 253 decides the communication policy information by QoS information based on transmission information that is information indicating a reliability request value of traffic. The decision unit 253 decides the communication policy information by QoS information based on transmission information that is information indicating a reliability request value of traffic. The decision unit 253 decides the communication policy information by QoS information based on transmission information that is information indicating a cycle of traffic.

The decision unit 253 determines a type of a message to be transmitted to another apparatus, and decides the QoS of the message. The decision unit 253 decides the QoS of the message by image recognition. The decision unit 253 decides the QoS of the message on the basis of header information of the message. The decision unit 253 decides the QoS of the message on the basis of metadata of the message. The decision unit 253 decides the QoS of the message on the basis of information related to DICOM of the message. The decision unit 253 decides the Qos level of the message.

[3-3. Conceptual Diagram of the Communication Control System]

Here, each function, a hardware configuration, and data in the communication control system will be conceptually described with reference to FIG. 14. FIG. 14 is a conceptual diagram illustrating an example of a communication control system according to the third embodiment. Specifically, FIG. 14 is a conceptual diagram illustrating an example of the communication control system in a case where the integrated QoS control table is created on the terminal 200B side. The communication control system illustrated in FIG. 14 corresponds to the communication control system 1B and includes the terminals 200B-1 to 200B-3 and the base station 100B.

"Adapter" in the terminal 200B indicates a function used to realize wireless communication control. For example, "Adapter" corresponds to a function for integrating QoS settings for each traffic. For example, the function of "Adapter" corresponds to the function of the decision unit 253 illustrated in FIG. 14.

Figure 15:
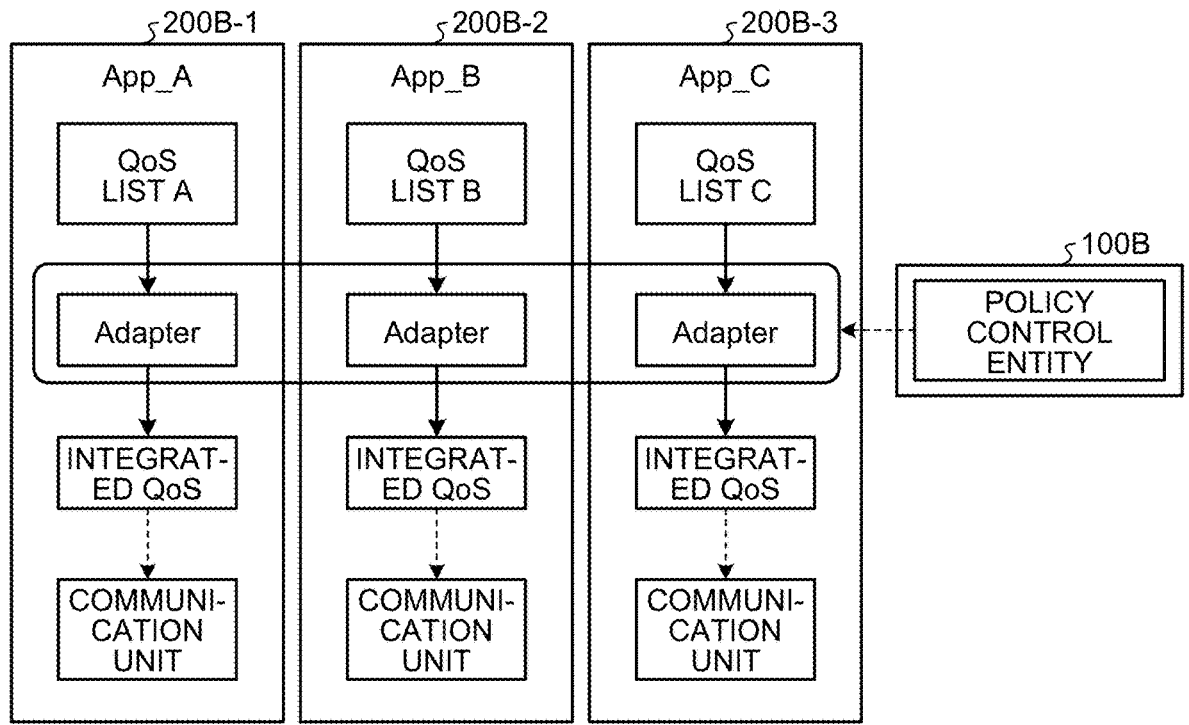
FIG. 15 is a conceptual diagram illustrating an example of a communication control system according to the third embodiment.

"Policy control entity" in the base station 100B controls "Adapter" of the terminals 200B-1 to 200B-3 and causes the terminals 200B-1 to 200B-3 to create an integrated QoS table. For example, the terminals 200B-1 to 200B-3 generate the integrated QoS control table by "Adapter". The terminals 200B-1 to 200B-3 control communication using the integrated QoS control table. In this way, in FIG. 15, only control of the Adapter control for converting the QoS list into the comprehensive QoS control table by the policy control entity is performed from the base station 100 side.

4. Fourth Embodiment

In the third embodiment described above, the case where each medical device (terminal 200B) decides the integrated Qos level, the wireless communication parameter, and the like has been described, but a predetermined wireless terminal apparatus among wireless terminal apparatuses may decide the integrated QoS level, the wireless communication parameter, and the like. Note that description of the same points as those of the base stations 100, 100A, and 100B and the terminals 200 and 200B described above will be omitted as appropriate.

[4-1. Configuration of the Communication Control System According to the Fourth Embodiment of the Present Disclosure]

Figure 16:
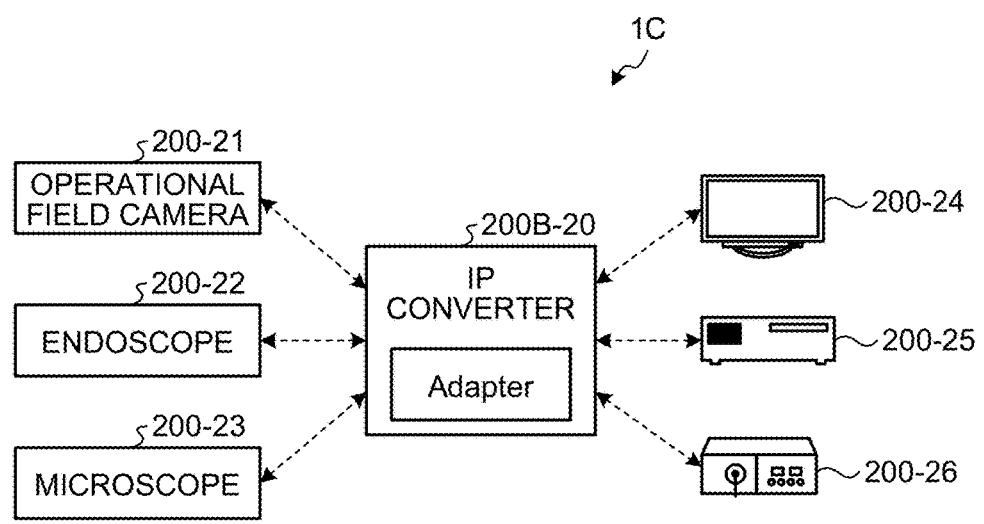
FIG. 16 is a diagram illustrating a configuration example of a communication control system according to a fourth embodiment of the present disclosure.

First, a configuration of a communication control system 1C that executes communication control processing according to the fourth embodiment will be described. FIG. 16 is a diagram illustrating a configuration example of a communication control system according to the fourth embodiment of the present disclosure.

As illustrated in FIG. 16, the communication control system 1C includes one terminal 200B and a plurality of terminals 200. As described above, the communication control system 1C includes the terminal 200B that decides the integrated QoS level, the wireless communication parameter, and the like, and the plurality of terminals 200 that controls communication according to the integrated QoS level, the wireless communication parameter, and the like acquired from the terminal 200B. In the example of FIG. 16, a terminal 200B-20, which is an IP converter, a terminal 200-21, which is an operational field camera, a terminal 200-22, which is an endoscope, a terminal 200-23, which is a microscope, a terminal 200-24, which is a 4K monitor, a terminal 200-25, which is a recorder (storage apparatus), and a terminal 200-26, which is a sphygmomanometer are illustrated. Note that the communication control system 1C is not limited to only the six terminals 200: the terminals 200-21 to 200-26, and may include various terminals 200. In addition, the communication control system 1C illustrated in FIG. 16 may include a plurality of terminals 100B.

The terminal 200B-20 is an IP converter that wirelessly transmits various data such as 4K or high definition (HD) video and a control signal. In the example of FIG. 16, the terminal 200B-20 is a medical IP converter that wirelessly transmits data such as various videos inside and outside the operating room. The terminal 200B-20 transmits and receives information to and from the terminal 200 such as the terminals 200-21 to 200-26 by wireless communication corresponding to 5G.

For example, the terminal 200B-20, which is an IP converter, converts various data into an internet protocol (IP) and transmits the IP. The terminal 200B-20 is connected to various terminals 200 including a 4K medical device (the terminal 200-24 or the like) so as to be capable of wireless communication, and wirelessly transmits video and control signals by converting various data of video signals from input to output into IPs. Thus, in the communication control system 1C, a simple system construction can be realized in a space of a medical institution such as an operating room.

The terminal 200B-20, which is an IP converter, has an "Adapter" function used to realize wireless communication control. "Adapter" in the terminal 200B-20 corresponds to a function for integrating QoS settings for each traffic. For example, the function of "Adapter" corresponds to the function of the decision unit 253 of the terminal 200B illustrated in FIG. 14. In the example of FIG. 16, the terminal 200B-20 requests the terminals 200-21 to 200-26 to transmit the QoS-related information, and acquires the QoS-related information from the terminals 200-21 to 200-26. Then, the terminal 200B-20 creates the integrated QoS control by using the QoS-related information of the terminals 200-21 to 200-26, and transmits the created integrated QoS control to the terminals 200-21 to 200-26.

5. Fifth Embodiment

Next, communication control for special interference will be described as a medical-specific communication control example. In some embodiments described above, the terminal controls the wireless communication parameter according to the transmission packet and the integrated QoS table, but in addition to this, additional control of wireless communication may be performed on the base station side. For example, in a space of a medical institution such as an operating room, a device that is expected to interfere with another device such as an electric scalpel may be used, and it is necessary to ensure communication quality of wireless communication even under an environment where such interference occurs.

Figure 17:
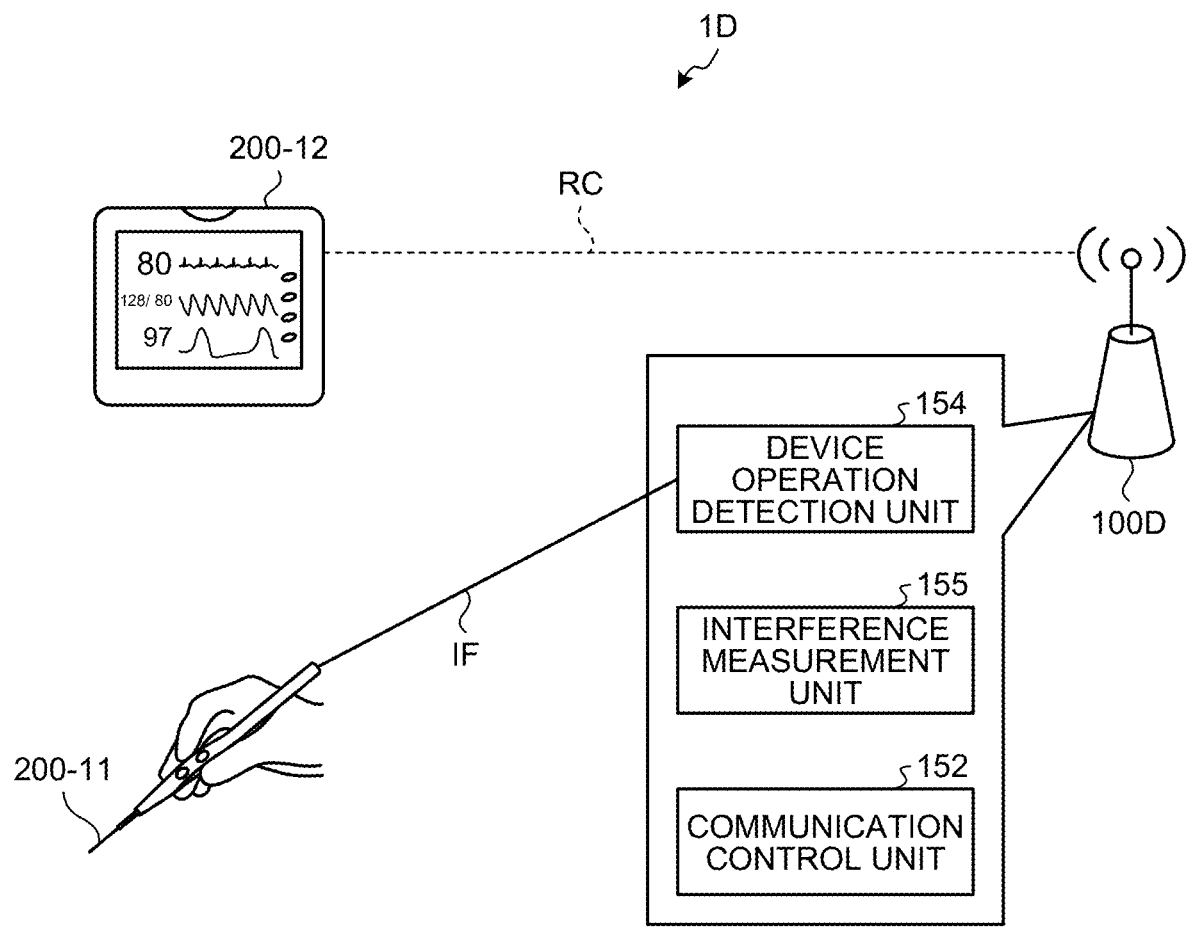
FIG. 17 is a diagram illustrating a configuration example of a communication control system according to a fifth embodiment of the present disclosure.

Therefore, the communication control system may detect interference and perform communication control according to the interference. This point will be described with reference to FIG. 17. FIG. 17 is a diagram illustrating a configuration example of a communication control system according to the fifth embodiment of the present disclosure. Note that the example of FIG. 17 illustrates a case where a base station 100D performs interference detection and performs communication control, but a wireless terminal apparatus may perform interference detection and perform communication control. Note that description of the same points as those of the base stations 100, 100A, and 100B and the terminals 200 and 200B described above will be omitted as appropriate.

[5-1. Configuration of the Communication Control System According to the Fifth Embodiment of the Present Disclosure]

First, a configuration of a communication control system 1D that executes communication control processing according to the fifth embodiment will be described. FIG. 17 is a diagram illustrating a configuration example of a communication control system according to the fifth embodiment of the present disclosure. FIG. 17 illustrates an example of the wireless communication link additional control for predictable interference.

As illustrated in FIG. 17, the communication control system 10 includes a base station 100D and a plurality of terminals 200. In the example of FIG. 17, only two terminals 200: a terminal 200-11, which is an electronic scalpel, and a terminal 200-12, which is an electrocardiograph, are illustrated, but the communication control system 10 may include three or more terminals 200.

Similarly to the base station 100, the base station 100D is an apparatus that provides a wireless communication service to the terminal 200. In the example of FIG. 17, the base station 100D is connected to the terminal 200-11, which is an electronic scalpel, by a predetermined interface IF. In addition, the base station 100D performs wireless communication with the terminal 200-12, which is an electrocardiograph, by wireless communication RC corresponding to 5G. For example, the base station 100D decides an integrated QoS level, a wireless communication parameter, and the like. The base station 100D has a function of an interference detection unit that detects interference related to communication. In addition, the base station 100D may set a profile of an interference device that is an interfering terminal 200.

A control unit 150D (illustration omitted) of the base station 100D, which includes a device operation detection unit 154 and an interference measurement unit 155, is different from the control unit 150 of the base station 100. The base station 100D includes the interference measurement unit 155 that functions as an interference detection unit that detects interference related to communication. The communication control unit 152 of the base station 100D controls wireless communication on the basis of the interference detected by the interference detection unit.

The device operation detection unit 154 detects the operation of the device (terminal 200). The device operation detection unit 154 acquires information indicating that an operation has been performed by the user, for example, an operation button of the device (terminal 200) has been pressed. The device operation detection unit 154 detects, for example, information generated by the operation of the device (terminal 200).

Figure 18:
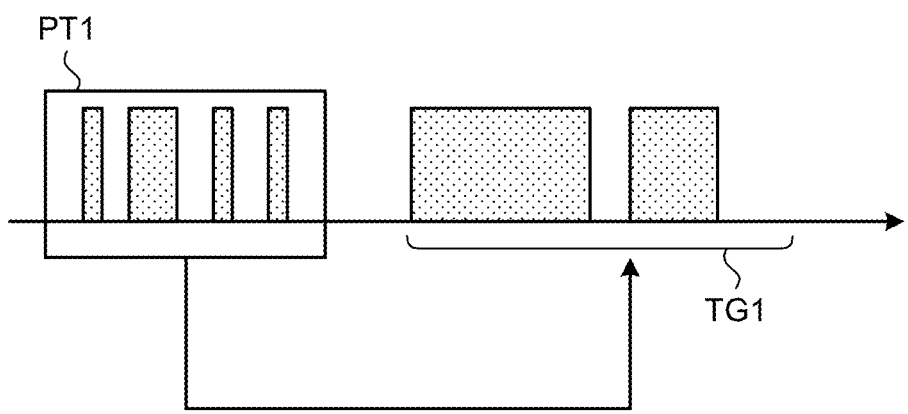
FIG. 18 is a diagram illustrating an example of processing related to measurement of interference according to the fifth embodiment.

The interference measurement unit 155 detects interference related to communication and measures interference by appropriately using various technologies related to interference detection and the like. The interference measurement unit 155 changes a measurement frequency of the interference measurement unit according to a type of an operating device (terminal 200) or an operation status of the device (terminal 200). The interference measurement unit 155 performs interference measurement every X ms, for example, when a target device (terminal 200) starts to operate. (Terminal 200) For example, in a case where interference from a specific type of device (terminal 200) is detected, interference measurement of a measurement frequency corresponding to the device (terminal 200) is performed. The interference measurement unit 155 changes a subsequent interference measurement frequency on the basis of an interference detection result obtained first. The interference measurement unit 155 makes a change according to, for example, an interference level and an interference pattern obtained first. As illustrated in FIG. 18, the interference measurement unit 155 generates a specific interference pattern for each device (terminal 200) and embeds information in the interference. FIG. 18 is a diagram illustrating an example of processing related to measurement of interference according to the fifth embodiment. Specifically, FIG. 18 illustrates an example of generation of a specific interference pattern.

In the example of FIG. 18, the interference measurement unit 155 generates an interference pattern characteristic of initial interference. The interference measurement unit 155 generates an interference pattern characteristic of initial interference as indicated at interference pattern PT1. The interference measurement unit 155 optimizes a measurement method. The interference measurement unit 155 optimizes a measurement method as indicated by target TG1.

The communication control unit 152 controls communication on the basis of information measured by the interference measurement unit 155. The communication control unit 152 switches the frequency according to the information measured by the interference measurement unit 155. The communication control unit 152 switches a licensed band and an unlicensed band according to the information measured by the interference measurement unit 155. The communication control unit 152 controls transmission power according to the information measured by the interference measurement unit 155. The communication control unit 152 increases transmission power of a link to be protected according to the information measured by the interference measurement unit 155.

The communication control unit 152 changes a coding rate according to the information measured by the interference measurement unit 155. The communication control unit 152 increases a coding rate of a link to be protected according to the information measured by the interference measurement unit 155. The communication control unit 152 performs repetition transmission according to the information measured by the interference measurement unit 155. The communication control unit 152 enables retransmission for a link to be protected according to the information measured by the interference measurement unit 155. For example, the communication control unit 152 performs hybrid automatic repeat request (HARQ) transmission according to the information measured by the interference measurement unit 155.

The communication control unit 152 changes a transmission scheme according to the information measured by the interference measurement unit 155. The communication control unit 152 changes a transmission method of a link to be protected according to the information measured by the interference measurement unit 155. For example, the communication control unit 152 may perform processing for improving communication quality and reliability, so-called transmission diversity processing, according to the information measured by the interference measurement unit 155. In addition, for example, the communication control unit 152 may perform MIMO transmission according to the information measured by the interference measurement unit 155.

The communication control unit 152 may perform priority control according to the information measured by the interference measurement unit 155. The communication control unit 152 lowers the communication quality of a link that is less required to be protected and increases the communication quality of a link to be protected according to the information measured by the interference measurement unit 155 The communication control unit 152 may change a packet transmission, pattern change, or resource allocation method according to the information measured by the interference measurement unit 155. The communication control unit 152 performs resource allocation so as to avoid an interference pattern of the device (terminal 200) according to the information measured by the interference measurement unit 155. The communication control unit 152 may switch from wireless communication to wired communication according to the information measured by the interference measurement unit 155. The communication control unit 152 switches to wired communication according to the information measured by the interference measurement unit 155. In addition, the communication control unit 152 may notify a person (such as an administrator of the communication control system 1D) of the necessity of switching.

For example, in a case where a large interference of the terminal 200-11 or the like, which is an electric scalpel, specific to a medical device, is expected to occur, the communication control system 1D may perform wireless communication control in consideration of the expected interference. The communication control system 1D detects activation of an apparatus assumed to affect wireless communication such as an electric scalpel in an operating room environment, and predicts interference with the wireless communication being used. Then, in a situation where the interference is predicted to occur, the communication control system 10 resets transmission/reception control parameters for wireless communication, and realizes wireless communication with high interference resistance. For example, the base station 100D of the communication control system 1D executes the above-described processing such as detection and prediction.

The base station 100D takes measures against predictable interference. The device operation detection unit 154 of the base station 100D functions as a detection unit that detects activation of an apparatus (for example, the terminal 200-12 or the like) that may affect wireless communication of the terminal 200-11 or the like, which is an electric scalpel, in an environment such as an operating room. In addition, the interference measurement unit 155 of the base station 100D functions as an interference prediction unit that predicts interference with the wireless communication being used. In a situation where the interference is predicted to occur, the communication control unit 152 of the base station 100D resets transmission/reception control parameters for wireless communication, and performs wireless communication with high interference resistance.

In addition, the above-described processing may be performed on the wireless terminal apparatus side. In this case, the terminal 200, which is a wireless terminal apparatus, includes an interference detection unit that detects interference related to communication. The interference detection unit detects interference related to communication and measures interference by appropriately using various technologies related to interference detection and the like. For example, the terminal 200 may include an interference measurement unit 155, which functions as the interference detection unit, or a device operation detection unit 154. The communication control unit 252 of the terminal 200 controls wireless communication on the basis of the interference detected by the interference detection unit. With the above-described processing, the communication control system 1D can appropriately execute wireless communication control in consideration of interference even in a case where generation of interference by the terminal 200 is predicted.

6. Other Embodiments

The processing according to each embodiment described above may be performed in various different forms (variation examples) other than each embodiment described above. For example, in the example described above, the wireless terminal apparatuses, which are the base stations 100, 100A, 100B, and 100C and the terminals 200 and 200B, are separate bodies, but the communication control system may include a wireless terminal apparatus that functions as a base station.

[6-1. Other Configuration Examples]

Figure 19:
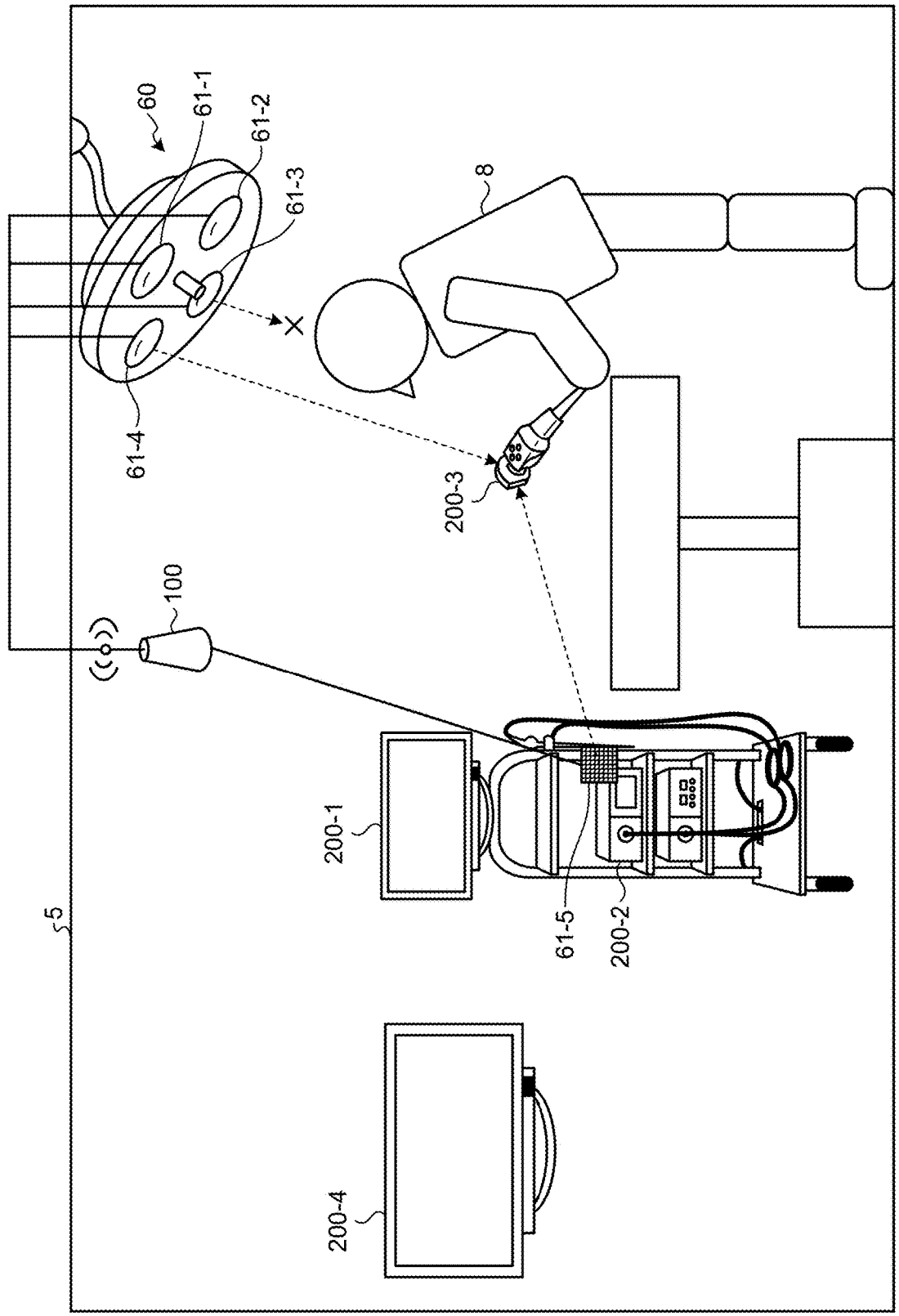
FIG. 19 is a diagram illustrating a configuration example of a communication control system according to a variation example of the present disclosure.

Here, as an example of communication control specific to medical care, communication control for blocking of wireless communication will be described. The terminal 200 controls the wireless communication parameter according to the transmission packet and the integrated QoS table, but in addition to this, additional control of wireless communication may be performed on the base station 100 side. As described above, the communication control system may perform communication control corresponding to blocking of wireless communication. This point will be described with reference to FIG. 19. FIG. 19 is a diagram illustrating a configuration example of a communication control system according to a variation example of the present disclosure.

In the operating room 5 illustrated in FIG. 19, a plurality of antenna panels 61 is arranged on a surgical light 60. FIG. 19 illustrates a case where four antenna panels 61-1 to 61-4 are arranged on the surgical light 60, but the number of antenna panels 61 arranged on the surgical light 60 is not limited to four. In addition, an antenna panel 61-5 is also arranged near the terminal 200-2. In FIG. 19, it is assumed that the four antenna panels 61-1 to 61-4 as illustrated as the antenna panel 61-5 are provided on the surgical light 60. Note that in a case where the antenna panels 61-1 to 61-5 and the like are described without being particularly distinguished, they are referred to as the antenna panel 61. The base station 100 performs wireless communication using the antenna panel 61. For example, the base station 100 performs wireless communication with the terminal 200 using the antenna panel 61.

For example, in the operating room 5 as illustrated in FIG. 19, a communication control system 1E determines the antenna panel 61, which is a plurality of MIMO communication antennas attached to the ceiling, the wall, the surgical light 60, and the like, according to a line of sight (LOS)/non-line of sight (NLOS) situation. The communication control system 1E determines the quality of the wireless link. For example, the base station 100 determines the antenna panel 61 according to the LOS/NLOS situation. In this case, the base station 100 may include a determination unit that determines the antenna panel 61 according to the LOS/NLOS situation.

Then, the communication control system 1E performs control to activate/deactivate the antenna panel 61 according to the LOS/NLOS determination of the antenna panel 61. For example, the communication control system 1E may recognize a space and collectively perform control of indoor beamforming or may learn. For example, the base station 100 may function as a beamforming management entity. The base station 100 performs control to activate/deactivate the antenna panel 61 according to the LOS/NLOS determination of the antenna panel 61. In this case, the base station 100 may include an operation control unit that performs control to activate/deactivate the antenna panel 61 according to the LOS/NLOS determination of the antenna panel 61. For example, the base station 100 may recognize a space and collectively perform control of indoor beamforming or may learn.

Thus, the communication control system 1E can solve the problem of blocking of MIMO communication due to a head, a body, or the like during the operation, and can establish a stable and robust wireless communication link.

For example, the communication control system 1E illustrated in FIG. 19 learns a wireless communication link state, and appropriately switches the communication link from an obstacle behavior prediction before the occurrence of blocking. For example, the communication control system 19 may include components such as a server such as the server 300 illustrated in FIG. 11. In the communication control system 1E, various types of control on the server side are performed. The server performs information collection processing corresponding to an information collection block for learning. The server acquires information of position between transmission and reception, information of 3D capture of an operating room, information of obstacle position, and a result of communication quality in each communication Link. For example, in order for the server to collect the above information, a communication quality report is set in the terminal 200 from the base station 100.

The server performs learning processing corresponding to a learning block. The server decides an optimal link and beamforming setting information in each communications environment. The server performs prediction processing corresponding to a behavior prediction block. The server performs behavior prediction of a moving object by using a camera.

The server performs determination processing corresponding to a determination block. The server performs determination as to necessity of link switching or switching of beamforming setting information from behavior prediction information and learning information.

The server performs processing corresponding to link switching and a beamforming setting change block. The server issues an instruction to activate/deactivate a plurality of transmission nodes. The server performs beamforming setting for use in the transmission nodes. Note that the above-described processing on the server side may be performed by the base station 100.

For example, the example of FIG. 19 illustrates a case where the base station 100 communicates with the terminal 200-3 using the antenna panel 61-3 among the plurality of antenna panels 61. Then, the example of FIG. 19 illustrates a case where the communication with the terminal 200-3 by the antenna panel 61-3 is blocked by the operator 8 due to movement of the position of the operator 8 or the like. Therefore, the base station 100 switches the communication with the terminal 200-3 by the antenna panel 61-3 to the communication by the antenna panel 61-4 or the communication by the antenna panel 61-5.

The communication control unit 152 of the base station 100 controls wireless communication according to the position of the antenna. The communication control unit 152 of the base station 100 controls wireless communication by various technologies related to wireless communication. The communication control unit 152 of the base station 100 controls wireless communication by beamforming. The communication control unit 152 of the base station 100 controls wireless communication by switching the antenna panel 61 used for communication among the plurality of antenna panels 61. For example, the communication control unit 152 of the base station 100 may select the antenna panel 61-4 having the highest reception strength among the plurality of antenna panels 61 as an antenna to be used for communication, and perform wireless communication using the selected antenna panel 61-4.

The antenna unit 110 of the base station 100 may have a plurality of antennas used for wireless communication. The communication control unit 152 of the base station 100 controls wireless communication according to the positions of the plurality of antennas. The communication control unit 152 of the base station 100 controls wireless communication by switching the antenna used for communication among the plurality of antennas.

In addition, the above-described processing may be performed on the wireless terminal apparatus side. In this case, the communication control unit 252 of the terminal 200, which is a wireless terminal apparatus, controls wireless communication according to the position of the antenna. The communication control unit 252 of the terminal 200 controls wireless communication by beamforming. The communication control unit 252 of the terminal 200 controls wireless communication by various technologies related to wireless communication. The communication control unit 252 of the terminal 200 controls wireless communication by beamforming.

The antenna unit 210 of the terminal 200 may have a plurality of antennas used for wireless communication. The communication control unit 252 of the terminal 200 controls wireless communication according to the positions of the plurality of antennas. The communication control unit 252 of the terminal 200 controls wireless communication by switching the antenna used for communication among the plurality of antennas. The communication control unit 252 of the terminal 200 may select an antenna having the highest reception strength among the plurality of antennas as an antenna to be used for communication, and perform wireless communication using the selected antenna.

[6-2. Others]

In addition, among the pieces of processing described in the above embodiments, all or some of the pieces of processing described as being performed automatically can be performed manually, or all or some of the pieces of processing described as being performed manually can be performed automatically by a known method. In addition, the processing procedures, the specific names, and the information including various data and parameters indicated in the document and the drawings can be arbitrarily changed unless otherwise specified. For example, the various types of information illustrated in each drawing are not limited to the illustrated information.

In addition, each component of each apparatus illustrated in the drawings is functionally conceptual, and is not necessarily physically configured as illustrated in the drawings. That is, a specific form of distribution and integration of apparatuses is not limited to those illustrated, and all or a part thereof can be functionally or physically distributed and integrated in an arbitrary unit according to various loads, usage situations, and the like.

In addition, the above-described embodiments and variation example can be appropriately combined within a range not contradicting processing contents.

In addition, the effects described in the present specification are merely examples and are not limitative, and there may be other effects.

7. Effects According to the Present Disclosure

As described above, the wireless terminal apparatus (the terminals 200 and 200B in the embodiments) according to the present disclosure is a wireless terminal apparatus that performs wireless communication with a medical device arranged in a space of a medical institution, and includes an acquisition unit (a first acquisition unit 251 in the embodiments) and a communication control unit (the communication control unit 252 in the embodiments). The acquisition unit acquires communication policy information decided by quality of service (QoS) information based on device information indicating the type of a medical device and transmission information indicating the type of a transmission content transmitted by the medical device. The communication control unit controls wireless communication on the basis of the communication policy information.

Thus, the wireless terminal apparatus according to the present disclosure can perform wireless communication according to the QoS corresponding to the medical device by controlling the wireless communication on the basis of the communication policy information according to the QoS based on the type of the medical device or the type of a transmission content transmitted by the medical device. Therefore, the wireless terminal apparatus can improve the communication quality of the wireless connection of the medical device arranged in the space of the medical institution.

In addition, the wireless terminal apparatus performs wireless communication with a medical device arranged in an operating room. Thus, when performing wireless communication with the medical device arranged in the operating room, the wireless terminal apparatus can perform wireless communication in the operating room according to the QoS by controlling the wireless communication on the basis of the communication policy information according to the QoS based on the type of the medical device performing communication and the type of a transmission content transmitted by the medical device. Therefore, the wireless terminal apparatus can improve the communication quality of the wireless connection of the medical device arranged in the space of the medical institution.

In addition, the communication control unit controls wireless communication with a communication timing based on the communication policy information. Thus, the wireless terminal apparatus can perform wireless communication at an appropriate communication timing in consideration of the QoS by controlling the wireless communication with the communication timing based on the communication policy information. Therefore, the wireless terminal apparatus can improve the communication quality of the wireless connection of the medical device arranged in the space of the medical institution.

In addition, the communication control unit controls wireless communication with a packet error rate based on the communication policy information. Thus, the wireless terminal apparatus can perform wireless communication at an appropriate packet error rate in consideration of the QoS by controlling the wireless communication with the packet error rate based on the communication policy information. Therefore, the wireless terminal apparatus can improve the communication quality of the wireless connection of the medical device arranged in the space of the medical institution.

In addition, the communication control unit controls the wireless communication while reducing the delay as the priority is higher. Thus, the wireless terminal apparatus can perform wireless communication with an appropriate communication delay in consideration of the QoS by controlling the wireless communication by reducing the delay as the priority is higher. Therefore, the wireless terminal apparatus can improve the communication quality of the wireless connection of the medical device arranged in the space of the medical institution.

In addition, the communication control unit controls wireless communication with an allocated frequency based on the communication policy information. Thus, the wireless terminal apparatus can perform wireless communication with an appropriate frequency allocation amount in consideration of the QoS by controlling the wireless communication at the allocated frequency based on the communication policy information. Therefore, the wireless terminal apparatus can improve the communication quality of the wireless connection of the medical device arranged in the space of the medical institution.

In addition, the communication control unit controls wireless communication with a transmission/reception strength based on the communication policy information. Thus, the wireless terminal apparatus can perform wireless communication with an appropriate transmission/reception strength in consideration of the QoS by controlling the wireless communication with the transmission/reception strength based on the communication policy information. Therefore, the wireless terminal apparatus can improve the communication quality of the wireless connection of the medical device arranged in the space of the medical institution.

In addition, the wireless terminal apparatus includes the decision unit (the decision unit 253 in the embodiments). The decision unit determines a type of a message to be transmitted to another apparatus, and decides the QoS of the message. The communication control unit controls wireless communication of a message on the basis of the QoS decided by the decision unit. Thus, the wireless terminal apparatus can control the wireless communication of the message according to the QoS of the message determined on the basis of the type of the message, and can improve the communication quality of the wireless connection of the medical device arranged in the space of the medical institution.

In addition, the decision unit decides the QoS of the message on the basis of header information of the message. Thus, the wireless terminal apparatus can control the wireless communication of the message according to the QoS of the message determined on the basis of the header information of the message, and can improve the communication quality of the wireless connection of the medical device arranged in the space of the medical institution.

In addition, the decision unit decides the QoS of the message on the basis of metadata of the message. Thus, the wireless terminal apparatus can control the wireless communication of the message according to the QoS of the message determined on the basis of the metadata of the message, and can improve the communication quality of the wireless connection of the medical device arranged in the space of the medical institution.

In addition, the transmission information is information indicating a type of traffic. Thus, the wireless terminal apparatus can perform wireless communication according to the QoS corresponding to the type of traffic by controlling the wireless communication on the basis of the communication policy information according to the QoS based on the type of traffic. Therefore, the wireless terminal apparatus can improve the communication quality of the wireless connection of the medical device arranged in the space of the medical institution.

In addition, the transmission information is information indicating a use of traffic. Thus, the wireless terminal apparatus can perform wireless communication according to the QoS corresponding to the use of traffic by controlling the wireless communication on the basis of the communication policy information according to the QoS based on the use of traffic. Therefore, the wireless terminal apparatus can improve the communication quality of the wireless connection of the medical device arranged in the space of the medical institution.

In addition, the communication control unit controls wireless communication with a medical device according to control by the base station. Thus, the wireless terminal apparatus can improve the communication quality of the wireless connection of the medical device arranged in the space of the medical institution by controlling the wireless communication with the medical device according to the control by the base station.

In addition, the wireless terminal apparatus is an IP converter. Thus, the IP converter, which is an example of the wireless terminal apparatus, can perform wireless communication according to the QoS corresponding to the medical device by controlling the wireless communication on the basis of the communication policy information according to the QoS based on the type of the medical device or the type of a transmission content transmitted by the medical device. Therefore, the IP converter can improve the communication quality of the wireless connection of the medical device arranged in the space of the medical institution.

In addition, the wireless terminal apparatus is a medical device. Thus, the IP converter, which is an example of the wireless terminal apparatus, can perform wireless communication according to the QoS corresponding to the medical device by controlling the wireless communication on the basis of the communication policy information according to the QoS based on the type of the medical device or the type of a transmission content transmitted by the medical device. Therefore, the medical device can improve the communication quality of the wireless connection of the medical device arranged in the space of the medical institution.

In addition, the wireless terminal apparatus includes an interference detection unit. The interference detection unit detects interference related to communication. The communication control unit controls wireless communication on the basis of the interference detected by the interference detection unit. Thus, the wireless terminal apparatus can control the wireless communication on the basis of the detected interference, and can improve the communication quality of the wireless connection of the medical device arranged in the space of the medical institution.

In addition, the wireless terminal apparatus includes the antenna (the antenna unit 210 in the embodiments). The antenna is used for wireless communication. The communication control unit controls wireless communication according to the position of the antenna. Thus, the wireless terminal apparatus can control the wireless communication in consideration of the position of the antenna, and can improve the communication quality of the wireless connection of the medical device arranged in the space of the medical institution.

As described above, the base station (the base stations 100, 100A, 100B, and 100D in the embodiments) according to the present disclosure is a wireless terminal apparatus that performs wireless communication with a medical device arranged in a space of a medical institution, and includes an acquisition unit (the acquisition unit 151 in the embodiments) and a communication control unit (the communication control unit 152 in the embodiments). The acquisition unit acquires the communication policy information decided by QoS information based on device information indicating the type of a medical device arranged in a space of a medical institution and transmission information indicating the type of a transmission content transmitted by the medical device. The communication control unit controls wireless communication between medical devices on the basis of the communication policy information.

Thus, the base station according to the present disclosure can control wireless communication between medical devices according to the QoS by controlling the wireless communication between the medical devices on the basis of the communication policy information according to the QoS based on the type of the medical device or the type of a transmission content transmitted by the medical device. Therefore, the base station can improve the communication quality of the wireless connection of the medical device arranged in the space of the medical institution.

8. Hardware Configuration

Figure 20:
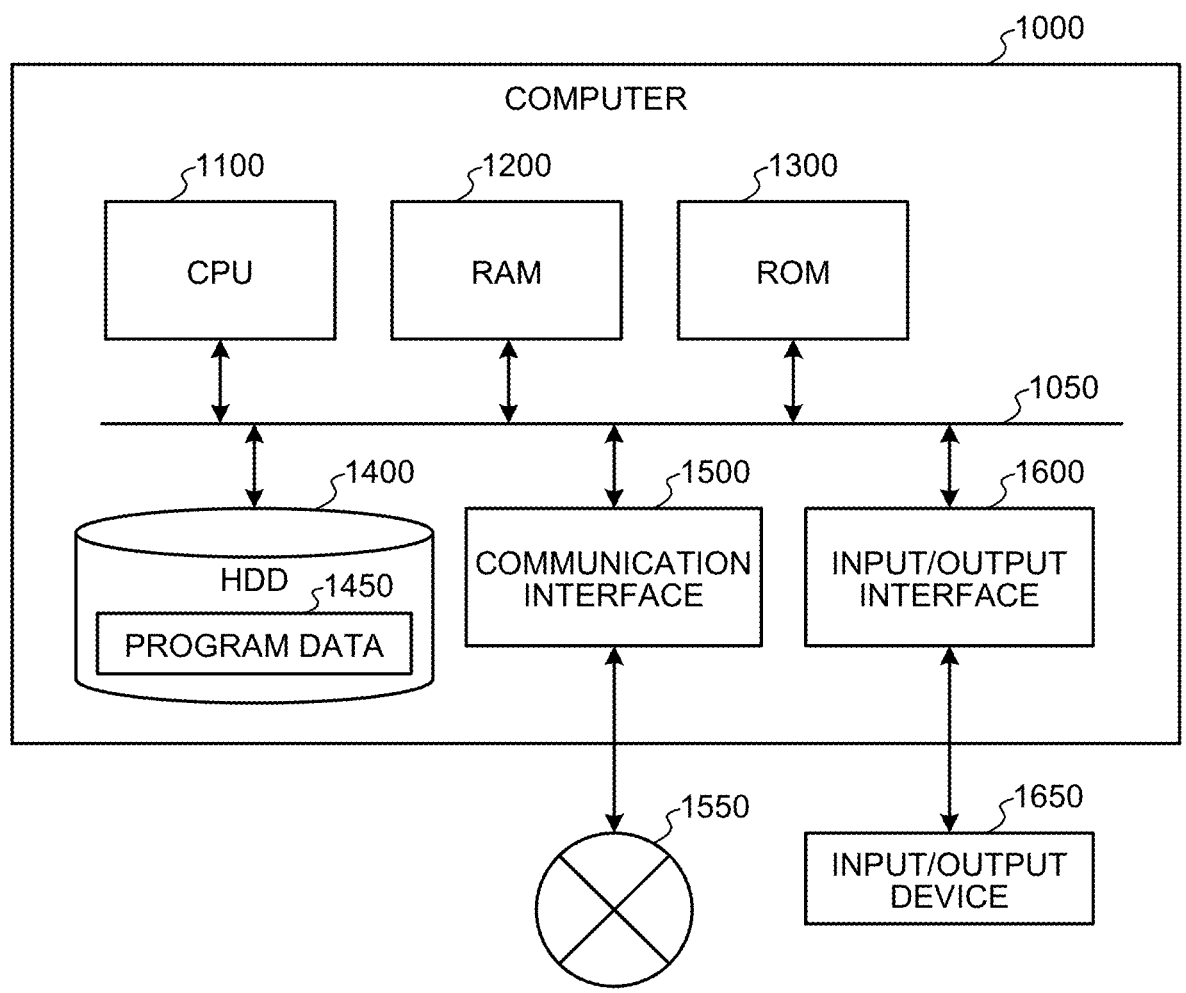
FIG. 20 is a hardware configuration diagram illustrating an example of a computer that realizes a function of a base station or a terminal.

The information devices such as the base stations 100, 100A, 100B, and 100D and the terminals 200 and 200B according to the embodiments described above are realized by a computer 1000 having a configuration as illustrated, for example, in FIG. 20. FIG. 20 is a hardware configuration diagram illustrating an example of the computer 1000 that realizes the functions of information processing apparatuses such as the base stations 100, 100A, 100B, and 100D and the terminals 200 and 200B.

Hereinafter, the terminal 200 according to the first embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 loads the program stored in the ROM 1300 or the HDD 1400 to the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, a printer, or the like via the input/output interface 1600. In addition, the input/output interface 1600 may function as a media interface that reads a program or the like recorded in a predetermined recording medium (medium). The medium is, for example, an optical recording medium such as a digital versatile disc (DVD), phase change rewritable disk (PD), a magneto-optical recording medium such as a magneto-optical disk (MO), a tape medium, a magnetic recording medium, a semiconductor memory, or the like. For example, in a case where the computer 1000 functions as the terminal 200 according to the embodiments, the CPU 1100 of the computer 1000 executes an information processing program loaded on the RAM 1200 to realize the functions of the control unit 250 and the like. In addition, the HDD 1400 stores an information processing program according to the present disclosure and data in the storage unit 240. Note that the CPU 1100 reads the program data 1450 from the HDD 1400 and executes the program data, but as another example, these programs may be acquired from another apparatus via the external network 1550.

Note that the present technology can also have the following configurations.

(1)

A wireless terminal apparatus that performs wireless communication with a medical device arranged in a space of a medical institution, the wireless terminal apparatus comprising:
an acquisition unit configured to acquire communication policy information decided by quality of service (QoS) information based on device information indicating a type of the medical device and transmission information indicating a type of a transmission content transmitted by the medical device; and
a communication control unit configured to control, the wireless communication on a basis of the communication policy information.

(2)

The wireless terminal apparatus according to (1) that performs the wireless communication with a medical, device arranged in an operating room.

(3)

The wireless terminal apparatus according to (1) or (2), in which the communication control unit controls the wireless communication in a communication mode decided on the basis of the communication policy information.

(4)

The wireless terminal apparatus according to (3), wherein the communication control unit controls the wireless communication with a communication timing based on the communication policy information.

(5)

The wireless terminal apparatus according to (3) or (4), wherein the communication control unit controls the wireless communication with a packet error rate based on the communication policy information.

(6)

The wireless terminal apparatus according to (5), in which the communication control unit controls the wireless communication by lowering a packet error rate as a priority is higher.

(7)

The wireless terminal apparatus according to any one of (3) to (6), in which the communication control unit controls the wireless communication with a communication delay based on the communication policy information.

(8)

The wireless terminal apparatus according to (7), wherein the communication control unit controls the wireless communication by reducing delay as a priority is higher.

(9)

The wireless terminal apparatus according to any one of (3) to (8), wherein the communication control unit controls the wireless communication with an allocated frequency based on the communication policy information.

(10)

The wireless terminal apparatus according to (9), in which the communication control unit controls the wireless communication by increasing an amount of frequency allocation as a priority is higher.

(11)

The wireless terminal apparatus according to any one of (3) to (10), wherein the communication control unit controls the wireless communication with a transmission/reception strength based on the communication policy information.

(12)

The wireless terminal apparatus according to (11), in which the communication control unit controls the wireless communication by increasing a transmission/reception strength as a priority is higher.

(13)
The wireless terminal apparatus according to (12), in which the communication control unit controls the wireless communication by increasing transmission power as a priority is higher.

(14)
The wireless terminal apparatus according to any one of (3) to (13), in which the communication control unit controls the wireless communication with a coding rate based on the communication policy information.

(15)
The wireless terminal apparatus according to any one of (1) to (14), comprising:
a decision unit configured to determine a type of a message to be transmitted to another apparatus and decide QoS of the message,
wherein
the communication control unit controls the wireless communication of the message on a basis of the QoS decided by the decision unit.

(16)
The wireless terminal apparatus according to (15), in which the decision unit decides the QoS of the message by image recognition.

(17)
The wireless terminal apparatus according to (15) or (16), wherein the decision unit decides the QoS of the message on a basis of header information of the message.

(18)
The wireless terminal apparatus according to any one of (15) to (17), wherein the decision unit decides the QoS of the message on a basis of metadata of the message.

(19)
The wireless terminal apparatus according to (18), in which the decision unit decides the QoS of the message on the basis of information related to DICOM of the message.

(20)
The wireless terminal apparatus according to any one of (15) to (19), in which
the decision unit decides a QoS level of the message, and
the communication control unit controls the wireless communication of the message on the basis of the QoS level decided by the decision unit.

(21)
The wireless terminal apparatus according to any one of (1) to (20), wherein the transmission information includes information indicating a type of traffic.

(22)
The wireless terminal apparatus according to any one of (1) to (21), wherein the transmission information includes information indicating a use of traffic.

(23)
The wireless terminal apparatus according to any one of (1) to (22), in which the transmission information includes information indicating a pattern of traffic.

(24)
The wireless terminal apparatus according to any one of (1) to (23), in which the transmission information includes information indicating a size of traffic.

(25)
The wireless terminal apparatus according to any one of (1) to (24), in which the transmission information includes information indicating a buffer amount of traffic.

(26)
The wireless terminal apparatus according to any one of (1) to (25), in which the transmission information includes information indicating a delay request value of traffic.

(27)
The wireless terminal apparatus according to any one of (1) to (26), in which the transmission information includes information indicating a reliability request value of traffic.

(28)
The wireless terminal apparatus according to any one of (1) to (27), in which the transmission information includes information indicating a cycle of traffic.

(29)
The wireless terminal apparatus according to any one of (1) to (28), wherein the communication control unit controls the wireless communication with a medical device according to control by a base station.

(30)
The wireless terminal apparatus according to (29), in which the communication control unit controls the wireless communication on the basis of the communication policy information set by a base station.

(31)
The wireless terminal apparatus according to any one of (1) to (30) that is an IP converter.

(32)
The wireless terminal apparatus according to (31) that is an IP converter arranged in a space of the medical institution.

(33)
The wireless terminal apparatus according to any one of (1) to (32) that is a medical device.

(34)
The wireless terminal apparatus according to (33) that is a medical device arranged in a space of the medical institution.

(35)
The wireless terminal apparatus according to any one of (1) to (34), comprising:
an interference detection unit configured to detect interference related to communication, wherein the communication control unit controls the wireless communication based on the interference detected by the interference detection unit.

(36)
The wireless terminal apparatus according to any one of (1) to (35), comprising:
an antenna used for the wireless communication,
wherein
the communication control unit controls the wireless communication according to a position of the antenna.

(37)
The wireless terminal apparatus according to (36), in which the communication control unit controls the wireless communication by beamforming.

(38)
The wireless terminal apparatus according to any one of (1) to (37), including:
a plurality of antennas used for the wireless communication,
in which
the communication control unit controls the wireless communication according to positions of the plurality of antennas.

(39)
The wireless terminal apparatus according to (38), in which the communication control unit controls the wireless communication by switching the antenna used for communication among the plurality of antennas.

(40)
A communication control method that performs wireless communication with a medical device arranged in a space of a medical institution, the communication control method comprising:
acquiring communication policy information decided by QoS information based on device information indicating a type of the medical device and transmission information indicating a type of a transmission content transmitted by the medical device; and
controlling the wireless communication on a basis of the communication policy information.

(41)
A communication control program that performs wireless communication with a medical device arranged in a space of a medical institution, the communication control program comprising:
acquiring communication policy information decided by QoS information based on device information indicating a type of the medical device and transmission information indicating a type of a transmission content transmitted by the medical device; and
controlling the wireless communication on a basis of the communication policy information.

(42)
A base station comprising:
an acquisition unit configured to acquire communication policy information decided by QoS information based on device information indicating a type of medical devices arranged in a space of a medical institution and transmission information indicating a type of a transmission content transmitted by the medical devices; and
a communication control unit configured to control wireless communication between the medical devices on a basis of the communication policy information.

REFERENCE SIGNS LIST

1 COMMUNICATION CONTROL SYSTEM
100 BASE STATION
120 COMMUNICATION UNIT
140 STORAGE UNIT
141 INTEGRATED QoS INFORMATION STORAGE UNIT
142 COMMUNICATION PARAMETER INFORMATION STORAGE UNIT
150 CONTROL UNIT
151 ACQUISITION UNIT
152 COMMUNICATION CONTROL UNIT
153 DECISION UNIT
200 TERMINAL (WIRELESS TERMINAL APPARATUS)
220 COMMUNICATION UNIT
240 STORAGE UNIT
241 QoS INFORMATION STORAGE UNIT
242 SETTING INFORMATION STORAGE UNIT
250 CONTROL UNIT
251 ACQUISITION UNIT
252 COMMUNICATION CONTROL UNIT

The invention claimed is:

1. A first medical device that performs wireless communication with a second medical device and a base station, wherein the first medical device and the second medical device are arranged in a space of a medical institution, the first medical device comprising:
a communication circuit configured to:
acquire, from the base station, communication policy information decided by an integrated quality of service (QoS) table based on first device information indicating a type of the first medical device and first transmission information indicating a first type of a first transmission content transmitted by the first medical device, the first medical device having at least two first types of the first transmission content, and second device information indicating a type of the second medical device and second transmission information indicating a second type of a second transmission content transmitted by the second medical device, the second medical device having at least two second types of the second transmission content, wherein the first medical device and the second medical device are used during a medical procedure, one of the first medical device and the second medical device to monitor real-time information of a patient during the medical procedure;
determine a type and QoS of a message to be transmitted to the second medical device;
determine the communication policy information from the integrated QoS table based on the second device information indicating the type of the second medical device and the first transmission information indicating the first type of the first transmission content to be transmitted by the first medical device; and
control the wireless communication with the second medical device on a basis of the communication policy information.

2. The first medical device according to claim 1, wherein the space is an operating room.

3. The first medical device according to claim 1, wherein the communication circuit is configured to control the wireless communication with a communication timing based on the communication policy information.

4. The first medical device according to claim 1, wherein the communication circuit is configured to control the wireless communication with a packet error rate based on the communication policy information.

5. The first medical device according to claim 1, wherein the communication circuit is configured to control the wireless communication by reducing delay as a priority is higher.

6. The first medical device according to claim 1, wherein the communication circuit is configured to control the wireless communication with an allocated frequency based on the communication policy information.

7. The first medical device according to claim 1, wherein the communication circuit is configured to control the wireless communication with a communication strength based on the communication policy information.

8. The first medical device according to claim 1,
wherein the communication circuit is configured to determine a type of a message to be transmitted to the second medical device and decide QoS of the message, and
further control the wireless communication of the message on a basis of the QoS of the message.

9. The first medical device according to claim 8, wherein the communication circuit is configured to decide the QoS of the message on a basis of header information of the message.

10. The first medical device according to claim 8, wherein the communication circuit is configured to decide the QoS of the message on a basis of metadata of the message.

11. The first medical device according to claim 1, wherein each of the first transmission information and the second transmission information includes information indicating a type of traffic.

12. The first medical device according to claim 1, wherein each of the first transmission information and the second transmission information includes information indicating a use of traffic.

13. The first medical device according to claim 1, comprising:
an interference detection circuit configured to detect interference related to the wireless communication,
wherein
the communication circuit is configured to further control the wireless communication based on the interference detected.

14. The first medical device according to claim 1, comprising:
an antenna used for the wireless communication,
wherein
the communication circuit is configured to control the wireless communication according to a position of the antenna.

15. A communication control method for a first medical device that performs wireless communication with a second medical device and a base station, wherein the first medical device and the second medical device are arranged in a space of a medical institution, the communication control method comprising:
acquiring, from the base station, communication policy information decided by an integrated quality of service (QoS) table based on first device information indicating a type of the first medical device and first transmission information indicating a first type of a first transmission content transmitted by the first medical device, the first medical device having at least two first types of the first transmission content, and second device information indicating a type of the second medical device and second transmission information indicating a second type of a second transmission content transmitted by the second medical device, the second medical device having at least two second types of the second transmission content, wherein the first medical device and the second medical device are used during a medical procedure, one of the first medical device and the second medical device to monitor real-time information of a patient during the medical procedure;
determining a type and QoS of a message to be transmitted to the second medical device;
determining the communication policy information from the integrated QoS table based on the second device information indicating the second type of the second medical device and the first transmission information indicating the first type of the first transmission content to be transmitted by the first medical device; and
controlling the wireless communication with the second medical device on a basis of the communication policy information.

16. The communication control method according to claim 15, further comprising:
sending, to the base station, a type of message to be transmitted from the first medical device to the second medical device wherein the base station further determines the communication policy information is based on a QoS of the message; and
acquiring, from the base station, the communication policy information.

17. A non-transitory computer-readable medium storing a communication control program having a program code when executed by a processor performs wireless communication of a first medical device with a second medical device and a base station, wherein the first medical device and the second medical device arranged in a space of a medical institution, the communication control program comprising:
acquiring, from the base station, communication policy information decided by an integrated quality of service (QoS) table based on first device information indicating a type of the first medical device and first transmission information indicating a first type of a first transmission content transmitted by the first medical device, the first medical device having at least two first types of the first transmission content, and second device information indicating a type of the second medical device and second transmission information indicating a second type of a second transmission content transmitted by the second medical device, the second medical device having at least two second types of the second transmission content, wherein the first medical device and the second medical device are used during a medical procedure, one of the first medical device and the second medical device to monitor real-time information of a patient during the medical procedure;
determining a type and QoS of a message to be transmitted to the second medical device;
determining the communication policy information from the integrated QoS table based on the second device information indicating the type of the second medical device and the first transmission information indicating the first type of the first transmission content to be transmitted by the first medical device; and
controlling the wireless communication with the second medical device on a basis of the communication policy information.

18. A non-transitory computer-readable medium according to claim 17, wherein the communication control program further comprises:
sending, to the base station, a type of message to be transmitted from the first medical device to the second medical device, wherein the base station further determines the communication policy information is based on a QoS of the message; and
acquiring, from the base station, the communication policy information.

19. A base station for controlling communication between a first medical device and a second medical device arranged in a space of a medical institution, the base station comprising:
circuitry configured to:
acquire, from the first medical device, first device information indicating a type of the first medical device and first transmission information indicating a first type of a first transmission content transmitted by the first medical device, the first medical device having at least two first types of the first transmission content;
acquire, from the second medical device, second device information indicating a type of the second medical device and second transmission information indicating a second type of a second transmission content transmitted by the second medical device, the second medical device having at least two second types of the second transmission content, wherein the first medical device and the second medical device are used during a medical procedure, one of the first medical device and the second medical device to monitor real-time information of a patient during the medical procedure;

determine communication policy information decided by an integrated QoS table based on the first device information, the first transmission information, the second device information, and the second transmission information;

determine a type and QoS of a message to be transmitted to the second medical device;

determine the communication policy information from the integrated QoS table based on the second device information indicating the type of the second medical device and the first transmission information indicating the first type of the first transmission content to be transmitted by the first medical device; and control wireless communication between the first medical device and the second medical device on a basis of the communication policy information.

20. The base station according to claim 19, wherein the circuitry is further configured to:

acquire, from the first medical device, a type of a message to be transmitted to the second medical device; and determine a QoS of the message, wherein the communication policy information is further determined on a basis of the QoS of the message.

* * * * *